(12) United States Patent
Nakagawa et al.

(10) Patent No.: US 8,705,208 B2
(45) Date of Patent: Apr. 22, 2014

(54) PERPENDICULAR MAGNETIC RECORDING MEDIUM (PMRM) AND MAGNETIC STORAGE DEVICE USING THE SAME

(75) Inventors: Hiroyuki Nakagawa, Yokohama (JP); Reiko Arai, Odawara (JP); Ichiro Tamai, Odawara (JP); Kiwamu Tanahashi, Kokubunji (JP)

(73) Assignee: HGST Netherlands B.V., Amsterdam (NL)

( * ) Notice: Subject to any disclaimer, the term of this patent is extended or adjusted under 35 U.S.C. 154(b) by 502 days.

(21) Appl. No.: 12/828,073

(22) Filed: Jun. 30, 2010

(65) Prior Publication Data

US 2011/0002064 A1    Jan. 6, 2011

(30) Foreign Application Priority Data

Jul. 1, 2009  (JP) ................... 2009-157192

(51) Int. Cl.
    *G11B 5/82*    (2006.01)
(52) U.S. Cl.
    USPC ........................................... 360/135
(58) Field of Classification Search
    None
    See application file for complete search history.

(56) References Cited

U.S. PATENT DOCUMENTS 7,601,445 B2   10/2009   Iwasaki et al. ............ 428/836.2

| | | | |
|---|---|---|---|
| 2007/0254189 A1 | 11/2007 | Nakagawa et al. | ........ 428/828.1 |
| 2009/0052074 A1* | 2/2009 | Nakagawa et al. | ............. 360/39 |
| 2010/0246062 A1* | 9/2010 | Albrecht et al. | .............. 360/131 |

FOREIGN PATENT DOCUMENTS

| JP | 2004/039030 | 2/2004 | ............. G11B 5/667 |
|---|---|---|---|
| JP | 2005-100537 | 4/2005 | |
| JP | 2006/302426 | 11/2006 | ............... G11B 5/65 |
| JP | 2007-272950 | 10/2007 | |

OTHER PUBLICATIONS

Zheng et al., "Role of Oxygen Incorporation in Co-Cr-Pt-Si-O Perpendicular Magnetic Recording Media" © 2004 IEEE, IEEE Transactions on Magnetics, vol. 40, No. 4, Jul. 2004.

* cited by examiner

*Primary Examiner* — David D Davis
(74) *Attorney, Agent, or Firm* — Zilka-Kotab, PC

(57) ABSTRACT

According to one embodiment, a PMRM includes a substrate, a soft magnetic underlayer above the substrate, an underlayer above the soft magnetic underlayer, an oxide-containing magnetic layer above the underlayer, and a ferromagnetic layer above the magnetic layer having no oxides. The underlayer controls orientation and segregation of the magnetic layer. The oxide-containing magnetic layer comprises at least two or more magnetic layers, a Cr concentration of the magnetic layer adjacent to the ferromagnetic metal layer is between about 23 at. % and about 32 at. %, and a difference between the Cr concentration of the magnetic layer adjacent to the ferromagnetic metal layer and a magnetic layer having a lowest Cr concentration among the at least three magnetic layers is less than about 25 at. %, the magnetic layer with a lowest Cr concentration has a granular structure, and a nucleation field is greater than about 159.2 kA/m.

18 Claims, 15 Drawing Sheets

| | First magnetic layer | | Second recording layer | | Cr concentration difference |
|---|---|---|---|---|---|
| | Target composition | Cr concentration | Target composition | Cr concentration | (at.%) |
| Sample 1-1 | 90.5[Co-3.5at.%Cr-18at.%Pt]-4SiO$_2$-4TiO$_2$-1.5Co$_3$O$_4$ | 3 | 96[Co-35at.%Cr-18at.%Pt]-4SiO$_2$ | 35 | 32.0 |
| Sample 1-2 | 90.5[Co-3.5at.%Cr-18at.%Pt]-4SiO$_2$-4TiO$_2$-1.5Co$_3$O$_4$ | 3 | 96[Co-32at.%Cr-18at.%Pt]-4SiO$_2$ | 32 | 29.0 |
| Sample 1-3 | 90.5[Co-3.5at.%Cr-18at.%Pt]-4SiO$_2$-4TiO$_2$-1.5Co$_3$O$_4$ | 3 | 96[Co-30at.%Cr-18at.%Pt]-4SiO$_2$ | 30 | 27.0 |
| Sample 1-4 | 90.5[Co-3.5at.%Cr-18at.%Pt]-4SiO$_2$-4TiO$_2$-1.5Co$_3$O$_4$ | 3 | 96[Co-27at.%Cr-18at.%Pt]-4SiO$_2$ | 27 | 24.0 |
| Sample 1-5 | 90.5[Co-3.5at.%Cr-18at.%Pt]-4SiO$_2$-4TiO$_2$-1.5Co$_3$O$_4$ | 3 | 96[Co-25at.%Cr-18at.%Pt]-4SiO$_2$ | 25 | 22.0 |
| Sample 1-6 | 90.5[Co-3.5at.%Cr-18at.%Pt]-4SiO$_2$-4TiO$_2$-1.5Co$_3$O$_4$ | 3 | 96[Co-23at.%Cr-18at.%Pt]-4SiO$_2$ | 23 | 20.0 |
| Sample 1-7 | 90.5[Co-3.5at.%Cr-18at.%Pt]-4SiO$_2$-4TiO$_2$-1.5Co$_3$O$_4$ | 3 | 96[Co-21at.%Cr-18at.%Pt]-4SiO$_2$ | 21 | 18.0 |
| Sample 1-8 | 90.5[Co-5.5at.%Cr-18at.%Pt]-4SiO$_2$-4TiO$_2$-1.5Co$_3$O$_4$ | 5 | 96[Co-35at.%Cr-18at.%Pt]-4SiO$_2$ | 35 | 30.0 |
| Sample 1-9 | 90.5[Co-5.5at.%Cr-18at.%Pt]-4SiO$_2$-4TiO$_2$-1.5Co$_3$O$_4$ | 5 | 96[Co-32at.%Cr-18at.%Pt]-4SiO$_2$ | 32 | 27.0 |
| Sample 1-10 | 90.5[Co-5.5at.%Cr-18at.%Pt]-4SiO$_2$-4TiO$_2$-1.5Co$_3$O$_4$ | 5 | 96[Co-30at.%Cr-18at.%Pt]-4SiO$_2$ | 30 | 25.0 |
| Sample 1-11 | 90.5[Co-5.5at.%Cr-18at.%Pt]-4SiO$_2$-4TiO$_2$-1.5Co$_3$O$_4$ | 5 | 96[Co-27at.%Cr-18at.%Pt]-4SiO$_2$ | 27 | 22.0 |
| Sample 1-12 | 90.5[Co-5.5at.%Cr-18at.%Pt]-4SiO$_2$-4TiO$_2$-1.5Co$_3$O$_4$ | 5 | 96[Co-25at.%Cr-18at.%Pt]-4SiO$_2$ | 25 | 20.0 |
| Sample 1-13 | 90.5[Co-5.5at.%Cr-18at.%Pt]-4SiO$_2$-4TiO$_2$-1.5Co$_3$O$_4$ | 5 | 96[Co-23at.%Cr-18at.%Pt]-4SiO$_2$ | 23 | 18.0 |
| Sample 1-14 | 90.5[Co-5.5at.%Cr-18at.%Pt]-4SiO$_2$-4TiO$_2$-1.5Co$_3$O$_4$ | 5 | 96[Co-21at.%Cr-18at.%Pt]-4SiO$_2$ | 21 | 16.0 |
| Sample 1-15 | 90.5[Co-10.5at.%Cr-18at.%Pt]-4SiO$_2$-4TiO$_2$-1.5Co$_3$O$_4$ | 10 | 96[Co-35at.%Cr-18at.%Pt]-4SiO$_2$ | 35 | 25.0 |
| Sample 1-16 | 90.5[Co-10.5at.%Cr-18at.%Pt]-4SiO$_2$-4TiO$_2$-1.5Co$_3$O$_4$ | 10 | 96[Co-32at.%Cr-18at.%Pt]-4SiO$_2$ | 32 | 22.0 |
| Sample 1-17 | 90.5[Co-10.5at.%Cr-18at.%Pt]-4SiO$_2$-4TiO$_2$-1.5Co$_3$O$_4$ | 10 | 96[Co-30at.%Cr-18at.%Pt]-4SiO$_2$ | 30 | 20.0 |
| Sample 1-18 | 90.5[Co-10.5at.%Cr-18at.%Pt]-4SiO$_2$-4TiO$_2$-1.5Co$_3$O$_4$ | 10 | 96[Co-27at.%Cr-18at.%Pt]-4SiO$_2$ | 27 | 17.0 |
| Sample 1-19 | 90.5[Co-10.5at.%Cr-18at.%Pt]-4SiO$_2$-4TiO$_2$-1.5Co$_3$O$_4$ | 10 | 96[Co-25at.%Cr-18at.%Pt]-4SiO$_2$ | 25 | 15.0 |
| Sample 1-20 | 90.5[Co-10.5at.%Cr-18at.%Pt]-4SiO$_2$-4TiO$_2$-1.5Co$_3$O$_4$ | 10 | 96[Co-23at.%Cr-18at.%Pt]-4SiO$_2$ | 23 | 13.0 |
| Sample 1-21 | 90.5[Co-10.5at.%Cr-18at.%Pt]-4SiO$_2$-4TiO$_2$-1.5Co$_3$O$_4$ | 10 | 96[Co-21at.%Cr-18at.%Pt]-4SiO$_2$ | 21 | 11.0 |
| Sample 1-22 | 90.5[Co-14.5at.%Cr-18at.%Pt]-4SiO$_2$-4TiO$_2$-1.5Co$_3$O$_4$ | 14 | 96[Co-35at.%Cr-18at.%Pt]-4SiO$_2$ | 35 | 21.0 |
| Sample 1-23 | 90.5[Co-14.5at.%Cr-18at.%Pt]-4SiO$_2$-4TiO$_2$-1.5Co$_3$O$_4$ | 14 | 96[Co-32at.%Cr-18at.%Pt]-4SiO$_2$ | 32 | 18.0 |
| Sample 1-24 | 90.5[Co-14.5at.%Cr-18at.%Pt]-4SiO$_2$-4TiO$_2$-1.5Co$_3$O$_4$ | 14 | 96[Co-30at.%Cr-18at.%Pt]-4SiO$_2$ | 30 | 16.0 |
| Sample 1-25 | 90.5[Co-14.5at.%Cr-18at.%Pt]-4SiO$_2$-4TiO$_2$-1.5Co$_3$O$_4$ | 14 | 96[Co-27at.%Cr-18at.%Pt]-4SiO$_2$ | 27 | 13.0 |
| Sample 1-26 | 90.5[Co-14.5at.%Cr-18at.%Pt]-4SiO$_2$-4TiO$_2$-1.5Co$_3$O$_4$ | 14 | 96[Co-25at.%Cr-18at.%Pt]-4SiO$_2$ | 25 | 11.0 |
| Sample 1-27 | 90.5[Co-14.5at.%Cr-18at.%Pt]-4SiO$_2$-4TiO$_2$-1.5Co$_3$O$_4$ | 14 | 96[Co-23at.%Cr-18at.%Pt]-4SiO$_2$ | 23 | 9.0 |
| Sample 1-28 | 90.5[Co-14.5at.%Cr-18at.%Pt]-4SiO$_2$-4TiO$_2$-1.5Co$_3$O$_4$ | 14 | 96[Co-21at.%Cr-18at.%Pt]-4SiO$_2$ | 21 | 7.0 |
| Sample 1-29 | 90.5[Co-17.5at.%Cr-18at.%Pt]-4SiO$_2$-4TiO$_2$-1.5Co$_3$O$_4$ | 17 | 96[Co-35at.%Cr-18at.%Pt]-4SiO$_2$ | 35 | 18.0 |
| Sample 1-30 | 90.5[Co-17.5at.%Cr-18at.%Pt]-4SiO$_2$-4TiO$_2$-1.5Co$_3$O$_4$ | 17 | 96[Co-32at.%Cr-18at.%Pt]-4SiO$_2$ | 32 | 15.0 |
| Sample 1-31 | 90.5[Co-17.5at.%Cr-18at.%Pt]-4SiO$_2$-4TiO$_2$-1.5Co$_3$O$_4$ | 17 | 96[Co-30at.%Cr-18at.%Pt]-4SiO$_2$ | 30 | 13.0 |
| Sample 1-32 | 90.5[Co-17.5at.%Cr-18at.%Pt]-4SiO$_2$-4TiO$_2$-1.5Co$_3$O$_4$ | 17 | 96[Co-27at.%Cr-18at.%Pt]-4SiO$_2$ | 27 | 10.0 |
| Sample 1-33 | 90.5[Co-17.5at.%Cr-18at.%Pt]-4SiO$_2$-4TiO$_2$-1.5Co$_3$O$_4$ | 17 | 96[Co-25at.%Cr-18at.%Pt]-4SiO$_2$ | 25 | 8.0 |
| Sample 1-34 | 90.5[Co-17.5at.%Cr-18at.%Pt]-4SiO$_2$-4TiO$_2$-1.5Co$_3$O$_4$ | 17 | 96[Co-23at.%Cr-18at.%Pt]-4SiO$_2$ | 23 | 6.0 |
| Sample 1-35 | 90.5[Co-17.5at.%Cr-18at.%Pt]-4SiO$_2$-4TiO$_2$-1.5Co$_3$O$_4$ | 17 | 96[Co-21at.%Cr-18at.%Pt]-4SiO$_2$ | 21 | 4.0 |
| Sample 1-36 | 90.5[Co-20.5at.%Cr-18at.%Pt]-4SiO$_2$-4TiO$_2$-1.5Co$_3$O$_4$ | 20 | 96[Co-35at.%Cr-18at.%Pt]-4SiO$_2$ | 35 | 15.0 |
| Sample 1-37 | 90.5[Co-20.5at.%Cr-18at.%Pt]-4SiO$_2$-4TiO$_2$-1.5Co$_3$O$_4$ | 20 | 96[Co-32at.%Cr-18at.%Pt]-4SiO$_2$ | 32 | 12.0 |
| Sample 1-38 | 90.5[Co-20.5at.%Cr-18at.%Pt]-4SiO$_2$-4TiO$_2$-1.5Co$_3$O$_4$ | 20 | 96[Co-30at.%Cr-18at.%Pt]-4SiO$_2$ | 30 | 10.0 |
| Sample 1-39 | 90.5[Co-20.5at.%Cr-18at.%Pt]-4SiO$_2$-4TiO$_2$-1.5Co$_3$O$_4$ | 20 | 96[Co-27at.%Cr-18at.%Pt]-4SiO$_2$ | 27 | 7.0 |
| Sample 1-40 | 90.5[Co-20.5at.%Cr-18at.%Pt]-4SiO$_2$-4TiO$_2$-1.5Co$_3$O$_4$ | 20 | 96[Co-25at.%Cr-18at.%Pt]-4SiO$_2$ | 25 | 5.0 |
| Sample 1-41 | 90.5[Co-20.5at.%Cr-18at.%Pt]-4SiO$_2$-4TiO$_2$-1.5Co$_3$O$_4$ | 20 | 96[Co-23at.%Cr-18at.%Pt]-4SiO2 | 23 | 3.0 |
| Sample 1-42 | 90.5[Co-20.5at.%Cr-18at.%Pt]-4SiO$_2$-4TiO$_2$-1.5Co$_3$O$_4$ | 20 | 96[Co-21at.%Cr-18at.%Pt]-4SiO2 | 21 | 1.0 |

FIG. 15

| | First magnetic layer 451 | | Second magnetic layer 452 | | Cr concentration difference (at %) | Hs (kA/m) | -Hn (kA/m) | OW (-dB) | S/N (dB) |
|---|---|---|---|---|---|---|---|---|---|
| | Target composition | Cr concentration | Target composition | Cr concentration | | | | | |
| Exemplary Embodiments | | | | | | | | | |
| 2-1 | 88.5[Co-10.5at%Cr-18at%Pt]-5SiO₂-5TiO₂-1.5Co₃O₄ | 10.0 | 96[Co-25at%Cr-18at%Pt]-4TiO₂ | 25.0 | 15.0 | 628.7 | 175.1 | 33.0 | 15.5 |
| 2-2 | 90.5[Co-10.5at%Cr-18at%Pt]-5SiO₂-3B₂O₃-1.5Co₃O₄ | 10.0 | 96[Co-25at%Cr-18at%Pt]-2SiO₂-2TiO₂ | 25.0 | 15.0 | 624.7 | 171.1 | 33.2 | 15.5 |
| 2-3 | 90.5[Co-10.5at%Cr-18at%Pt]-5TiO₂-3B₂O₃-1.5Co₃O₄ | 10.0 | 96[Co-25at%Cr-18at%Pt]2SiO₂-2TiO₂ | 25.0 | 15.0 | 620.7 | 168.7 | 33.5 | 15.3 |
| 2-4 | 94.5[Co-10.5at%Cr-18at%Pt]-2Ta₂O₅-3B₂O₃-1.5Co₃O₄ | 10.0 | 98[Co-25at%Cr-18at%Pt]-2Ta₂O₅ | 25.0 | 15.0 | 632.6 | 173.5 | 32.5 | 15.4 |
| 2-5 | 94.5[Co-10.5at%Cr-18at%Pt]-2Nb₂O₅-3B₂O₃-1.5Co₃O₄ | 10.0 | 98[Co-25at%Cr-18at%Pt]-2Nb₂O₅ | 25.0 | 15.0 | 628.7 | 171.9 | 33.0 | 15.3 |
| 2-6 | 88.5[Co-10.5at%Cr-18at%Pt]-2Nb₂O₅-2Ta₂O₅-1.5Co₃O₄ | 10.0 | 97[Co-25at%Cr-18at%Pt]-3B₂O₃ | 25.0 | 15.0 | 612.7 | 167.1 | 34.0 | 15.4 |
| 2-7 | 88.5[Co-10.5at%Cr-18at%Pt]-5SiO₂-2Ta₂O₅-1.5Co₃O₄ | 10.0 | 96[Co-25at%Cr-18at%Pt]-4SiO₂ | 25.0 | 15.0 | 632.6 | 175.1 | 32.0 | 15.3 |
| 2-8 | 88.5[Co-10at%Cr-18at%Pt]-5SiO₂-5TiO₂ | 10.0 | 96[Co-25at%Cr-18at%Pt]-4TiO₂ | 25.0 | 15.0 | 596.8 | 183.0 | 36.0 | 14.6 |
| Comparative Examples | | | | | | | | | |
| 2-1 | 90[Co-10at%Cr-18at%Pt]-10SiO₂ | 10.0 | 96[Co-25at%Cr-18at%Pt]-4TiO₂ | 25.0 | 15.0 | 604.8 | 143.2 | 35.0 | 13.5 |
| 2-2 | 88.5[Co-10.5at%Cr-18at%Pt]-5SiO₂-5TiO₂-1.5Co₃O₄ | 10.0 | Co-25at%Cr-18at%Pt | 25.0 | 15.0 | 517.3 | 119.4 | 42.0 | 12.6 |
| 2-3 | Co-10at%Cr-18at%Pt | 10.0 | 96[Co-25at%Cr-18at%Pt]-4TiO₂ | 25.0 | 15.0 | 397.9 | 63.7 | 50.0 | 7.4 |

| Exemplary | Target composition | Magnetic Layer 453 | | |
|---|---|---|---|---|
| | | Cr concentration (at%) | Oxygen concentration (%) | Film thickness (nm) |
| embodiment 3-1 | 90.5[Co-14.5at%Cr-18at%Pt]-4SiO$_2$-4TiO$_2$-1.5Co$_3$O$_4$ | 14.0 | 1.0 | 4.0 |
| embodiment 3-2 | 90.5[Co-14.5at%Cr-18at%Pt]-4SiO$_2$-4TiO$_2$-1.5Co$_3$O$_4$ | 14.0 | 1.0 | 4.0 |
| embodiment 3-3 | 90.5[Co-14.5at%Cr-18at%Pt]-4SiO$_2$-4TiO$_2$-1.5Co$_3$O$_4$ | 14.0 | 0.8 | 4.0 |
| embodiment 3-4 | 88.5[Co-5.5at%Cr-18at%Pt]-5SiO$_2$-5TiO$_2$-1.5Co$_3$O$_4$ | 5.0 | 0.8 | 3.5 |
| embodiment 3-5 | 88.5[Co-10.5at%Cr-22at%Pt]-5SiO$_2$-5TiO$_2$-1.5Co$_3$O$_4$ | 10.0 | 0.8 | 4.0 |
| embodiment 3-6 | 88.5[Co-10.5at%Cr-22at%Pt]-5SiO$_2$-5TiO$_2$-1.5Co$_3$O$_4$ | 10.0 | 0.8 | 4.0 |
| embodiment 3-7 | 88.5[Co-10.5at%Cr-22at%Pt]-5SiO$_2$-5TiO$_2$-1.5Co$_3$O$_4$ | 10.0 | 0.8 | 4.0 |
| embodiment 3-8 | 88.5[Co-10.5at%Cr-22at%Pt]-5SiO$_2$-5TiO$_2$-1.5Co$_3$O$_4$ | 10.0 | 0.8 | 4.0 |
| embodiment 3-9 | 88.5[Co-10.5at%Cr-22at%Pt]-5SiO$_2$-5TiO$_2$-1.5Co$_3$O$_4$ | 10.0 | 0.8 | 4.0 |
| embodiment 3-10 | 88.5[Co-7.5at%Cr-22at%Pt]-5SiO$_2$-5TiO$_2$-1.5Co$_3$O$_4$ | 7.0 | 0.8 | 3.5 |
| embodiment 3-11 | 88.5[Co-5.5at%Cr-22at%Pt]-5SiO$_2$-5TiO$_2$-1.5Co$_3$O$_4$ | 5.0 | 0.8 | 3.5 |
| embodiment 3-12 | 80.5[Co-17.5at%Cr-20at%Pt]-4SiO$_2$-4TiO$_2$-1.5Co$_3$O$_4$ | 17.0 | 1.0 | 4.0 |
| embodiment 3-13 | 90.5[Co-17.5at%Cr-20at%Pt]-4SiO$_2$-4TiO$_2$-1.5Co$_3$O$_4$ | 17.0 | 0.8 | 4.0 |
| Comparison 3-1 | 90.5[Co-14.5at%Cr-18at%Pt]-4SiO$_2$-4TiO$_2$-1.5Co$_3$O$_4$ | 14.0 | 1.0 | 4.0 |
| Comparison 3-2 | 90.5[Co-14.5at%Cr-18at%Pt]-4SiO$_2$-4TiO$_2$-1.5Co$_3$O$_4$ | 14.0 | 1.0 | 4.0 |
| Comparison 3-3 | 90.5[Co-14.5at%Cr-22at%Pt]-5SiO$_2$-5TiO$_2$-1.5Co$_3$O$_4$ | 5.0 | 0.8 | 3.5 |
| Comparison 3-4 | 88.5[Co-10.5at%Cr-22at%Pt]-5SiO$_2$-5TiO$_2$-1.5Co$_3$O$_4$ | 10.0 | 0.8 | 4.0 |
| Comparison 3-5 | 88.5[Co-10.5at%Cr-22at%Pt]-5SiO$_2$-5TiO$_2$-1.5Co$_3$O$_4$ | 10.0 | 0.8 | 4.0 |
| Comparison 3-6 | Co-10at%Cr-22at%Pt | 10.0 | 0.0 | 4.0 |
| Comparison 3-7 | 88.5[Co-10.5at%Cr-22at%Pt]-5SiO$_2$-5TiO$_2$-1.5Co$_3$O$_4$ | 10.0 | 0.8 | 4.0 |
| Comparison 3-8 | 88.5[Co-10.5at%Cr-22at%Pt]-10SiO$_2$ | 10.0 | 0.8 | 4.0 |
| Comparison 3-9 | 88.5[Co-5.5at%Cr-22at%Pt]-5SiO$_2$-5TiO$_2$-1.5Co$_3$O$_4$ | 10.0 | 0.8 | 3.5 |
| Comparison 3-10 | 90.5[Co-3.5at%Cr-20at%Pt]-5SiO$_2$-5TiO$_2$-1.5Co$_3$O$_4$ | 3.0 | 0.8 | 4.0 |

| | Magnetic layer 454 | | | |
|---|---|---|---|---|
| Exemplary | Target composition | Cr concentration (at%) | Oxygen concentration (%) | Film thickness (nm) |
| embodiment 3-1 | 93.5[Co-26.5at%Cr-18at%Pt]-4SiO$_2$-2.5Co$_3$O$_4$ | 26.0 | 0.5 | 3.0 |
| embodiment 3-2 | 93.5[Co-26.5at%Cr-18at%Pt]-4SiO$_2$-2.5Co$_3$O$_4$ | 26.0 | 0.5 | 3.0 |
| embodiment 3-3 | 93.5[Co-26.5at%Cr-18at%Pt]-4SiO$_2$-2.5Co$_3$O$_4$ | 26.0 | 0.5 | 3.0 |
| embodiment 3-4 | 93.5[Co-30.5at%Cr-18at%Pt]-4SiO$_2$-2.5Co$_3$O$_4$ | 30.0 | 1.0 | 3.0 |
| embodiment 3-5 | 93.5[Co-24.5at%Cr-18at%Pt]-4SiO$_2$-2.5Co$_3$O$_4$ | 24.0 | 0.0 | 3.0 |
| embodiment 3-6 | 92.5[Co-24.5at%Cr-18at%Pt]-2.5SiO$_2$-2.5TiO$_2$-2.5Co$_3$O$_4$ | 24.0 | 0.0 | 3.0 |
| embodiment 3-7 | 94[Co-24.5at%Cr-18at%Pt]-2B$_2$O$_3$-1.5Ta$_2$O$_5$-2.5Co$_3$O$_4$ | 24.0 | 0.0 | 3.0 |
| embodiment 3-8 | 93[Co-24.5at%Cr-18at%Pt]-2B$_2$O$_3$-2.5SiO$_2$-2.5Co$_3$O$_4$ | 24.0 | 0.0 | 3.0 |
| embodiment 3-9 | 94.5[Co-24.5at%Cr-18at%Pt]-2.5SiO$_2$-1.5Ta$_2$O$_5$-2.5Co$_3$O$_4$ | 24.0 | 1.0 | 3.0 |
| embodiment 3-10 | 93.5[Co-32.5at%Cr-18at%Pt]-4SiO$_2$-2.5Co$_3$O$_4$ | 32.0 | 0.8 | 3.0 |
| embodiment 3-11 | 88.5[Co-7.5at%Cr-18at%Pt]-5SiO$_2$-1.5Co$_3$O$_4$ | 7.0 | 0.8 | 3.0 |
| embodiment 3-12 | 88.5[Co-5.5at%Cr-18at%Pt]-5SiO$_2$-1.5Co$_3$O$_4$ | 5.0 | 1.5 | 3.0 |
| embodiment 3-13 | 93.5[Co-24.5at%Cr-10at%Pt]-5SiO$_2$-2.5Co$_3$O$_4$ | 24.0 | 0.5 | 3.0 |
| Comparison 3-1 | 93.5[Co-26.5at%Cr-18at%Pt]-4SiO$_2$-2.5Co$_3$O$_4$ | 26.0 | 0.5 | 3.0 |
| Comparison 3-2 | 93.5[Co-26.5at%Cr-18at%Pt]-4SiO$_2$-2.5Co$_3$O$_4$ | 26.0 | 1.0 | 3.0 |
| Comparison 3-3 | 93.5[Co-32.5at%Cr-18at%Pt]-4SiO$_2$-2.5Co$_3$O$_4$ | 32.0 | 1.0 | 3.0 |
| Comparison 3-4 | 93.5[Co-35.5at%Cr-18at%Pt]-4TiO$_2$-2.5Co$_3$O$_4$ | 35.0 | 0.0 | 3.0 |
| Comparison 3-5 | Co-24at%Cr-14at%Pt | 24.0 | 0.0 | 3.0 |
| Comparison 3-6 | 93.5[Co-24.5at%Cr-18at%Pt]-4TiO$_2$-2.5Co$_3$O$_4$ | 24.0 | 0.0 | 3.0 |
| Comparison 3-7 | 93.5[Co-24.5at%Cr-18at%Pt]-4TiO$_2$-2.5Co$_3$O$_4$ | 24.0 | 0.0 | 3.0 |
| Comparison 3-8 | 93.5[Co-24.5at%Cr-18at%Pt]-4TiO$_2$-2.5Co$_3$O$_4$ | 24.0 | 0.8 | 3.0 |
| Comparison 3-9 | 90.5[Co-6.5at%Cr-18at%Pt]-4SiO$_2$-4TiO$_2$-1.5Co$_3$O$_4$ | 6.0 | 0.0 | 3.0 |
| Comparison 3-10 | 93.5[Co-26.5at%Cr-10at%Pt]-5SiO$_2$-2.5Co$_3$O$_4$ | 24.0 | 0.5 | 3.0 |

| | | Magnetic layer 455 | | | Maximum value of difference in Cr concentration in adjacent magnetic layers containing oxides (at%) | Difference in Cr concentration of magnetic layers 453 and 455 (at%) | Hs (kA/m) | -Hn (kA/m) | OW (-db) | S/N (dB) |
|---|---|---|---|---|---|---|---|---|---|---|
| Exemplary | Target composition | Cr concentration (at%) | Oxygen concentration (%) | Film thickness (nm) | | | | | | |
| embodiment 3-1 | 95[Co-23at%Cr-14at%Pt]-5SiO₂ | 23.0 | 10.0 | 4.5 | 12.0 | 9.0 | 644.8 | 175.1 | 32.8 | 15.8 |
| embodiment 3-2 | 96[Co-25at%Cr-14at%Pt]-4SiO₂ | 25.0 | 10.0 | 4.5 | 12.0 | 11.0 | 628.7 | 169.3 | 36.0 | 16.4 |
| embodiment 3-3 | 96[Co-32at%Cr-14at%Pt]-4SiO₂ | 32.0 | 10.0 | 4.5 | 12.0 | 18.0 | 620.7 | 159.2 | 37.1 | 16.3 |
| embodiment 3-4 | 96[Co-32at%Cr-18at%Pt]-4SiO₂ | 32.0 | 10.0 | 5.0 | 25.0 | 27.0 | 644.6 | 175.1 | 33.5 | 15.3 |
| embodiment 3-5 | 96[Co-26at%Cr-14at%Pt]-4SiO₂ | 26.0 | 10.0 | 4.0 | 14.0 | 16.0 | 628.7 | 171.1 | 37.0 | 16.0 |
| embodiment 3-6 | 96[Co-26at%Cr-14at%Pt]-4SiO₂ | 26.0 | 10.0 | 4.0 | 14.0 | 16.0 | 612.7 | 169.5 | 38.5 | 16.1 |
| embodiment 3-7 | 96[Co-26at%Cr-14at%Pt]-4SiO₂ | 26.0 | 10.0 | 4.0 | 14.0 | 16.0 | 620.7 | 163.1 | 37.5 | 16.1 |
| embodiment 3-8 | 96[Co-26at%Cr-14at%Pt]-4SiO₂ | 26.0 | 10.0 | 4.0 | 14.0 | 16.0 | 615.7 | 160.7 | 38.0 | 16.1 |
| embodiment 3-9 | 96[Co-26at%Cr-14at%Pt]-4SiO₂ | 26.0 | 10.0 | 4.0 | 14.0 | 16.0 | 620.7 | 168.7 | 37.2 | 16.2 |
| embodiment 3-10 | 96[Co-32at%Cr-18at%Pt]-4SiO₂ | 25.0 | 10.0 | 4.0 | 25.0 | 18.0 | 652.5 | 163.1 | 33.0 | 15.4 |
| embodiment 3-11 | 96[Co-32at%Cr-14at%Pt]-4SiO₂ | 32.0 | 10.0 | 5.0 | 25.0 | 27.0 | 660.5 | 183.0 | 31.0 | 15.0 |
| embodiment 3-12 | 96[Co-25at%Cr-14at%Pt]-5SiO₂ | 25.0 | 10.0 | 5.0 | 20.0 | 8.0 | 660.5 | 175.1 | 31.0 | 15.7 |
| embodiment 3-13 | 96[Co-25at%Cr-14at%Pt]-5SiO₂ | 25.0 | 10.0 | 4.0 | 7.0 | 8.0 | 628.7 | 163.1 | 36.0 | 16.1 |
| Comparison 3-1 | 96[Co-21at%Cr-14at%Pt]-4SiO₂ | 21.0 | 10.0 | 4.5 | 12.0 | 7.0 | 691.1 | 183.0 | 26.5 | 13.5 |
| Comparison 3-2 | 96[Co-35at%Cr-14at%Pt]-4SiO₂ | 35.0 | 10.0 | 4.5 | 12.0 | 21.0 | 673.2 | 146.3 | 25.3 | 13.0 |
| Comparison 3-3 | 96[Co-32at%Cr-18at%Pt]-4SiO₂ | 32.0 | 10.0 | 4.0 | 27.0 | 27.0 | 700.3 | 167.1 | 22.7 | 12.8 |
| Comparison 3-4 | 96[Co-26at%Cr-18at%Pt]-4SiO₂ | 26.0 | 10.0 | 4.0 | 25.0 | 16.0 | 708.2 | 163.1 | 22.2 | 12.3 |
| Comparison 3-5 | 96[Co-25at%Cr-14at%Pt]-4SiO₂ | 25.0 | 10.0 | 4.0 | 14.0 | 16.0 | 531.6 | 143.2 | 45.4 | 10.9 |
| Comparison 3-6 | 96[Co-26at%Cr-14at%Pt]-4SiO₂ | 26.0 | 10.0 | 4.0 | 16.0 | 16.0 | 461.5 | 79.6 | 48.6 | 7.4 |
| Comparison 3-7 | Co-26at%Cr-14at%Pt | 26.0 | 0.0 | 4.0 | 14.0 | 16.0 | 557.0 | 135.3 | 42.7 | 14.3 |
| Comparison 3-8 | 96[Co-26at%Cr-14at%Pt]-4SiO₂ | 26.0 | 10.0 | 4.0 | 14.0 | 16.0 | 604.8 | 143.2 | 33.9 | 14.5 |
| Comparison 3-9 | 96[Co-32at%Cr-18at%Pt]-4SiO₂ | 32.0 | 10.0 | 5.0 | 26.0 | 22.0 | 732.1 | 171.1 | 20.3 | 12.0 |
| Comparison 3-10 | 96[Co-25at%Cr-14at%Pt]-4SiO₂ | 25.0 | 10.0 | 4.0 | 21.0 | 22.0 | 700.3 | 181.0 | 26.0 | 13.1 |

FIG. 18

| Exemplary | Magnetic layer 456 | | | | Magnetic layer 457 | | | |
|---|---|---|---|---|---|---|---|---|
| | Target Composition | Cr concentration (at%) | Oxygen concentration (%) | Film thickness (nm) | Target composition | Cr concentration (at%) | Oxygen concentration (%) | Film thickness (nm) |
| embodiment 3-14 | 88.5[Co-10.5at%Cr-22at%Pt]-5SiO$_2$-5TiO$_2$-1.5Co$_3$O$_4$ | 10.0 | 0.8 | 4.0 | 93.5[Co-28.5at%Cr-18at%Pt]-4SiO$_2$-2.5Co$_3$O$_4$ | 26 | 0.5 | 3.0 |
| embodiment 3-15 | 93.5[Co-30.5at%Cr-16at%Pt]-4SiO$_2$-2.5Co$_3$O$_4$ | 30.0 | 1.0 | 1.5 | 88.5[Co-10.5at%Cr-22at%Pt]-5SiO$_2$-5TiO$_2$-1.5Co$_3$O$_4$ | 10 | 0.8 | 4.0 |

| Magnetic layer 458 | | | | Magnetic layer 459 | | | | Maximum value of difference in Cr concentration in adjacent magnetic layers containing oxides (%) | Hs (kA/m) | -Hn (kA/m) | OW (-dB) | S/N (dB) |
|---|---|---|---|---|---|---|---|---|---|---|---|---|
| Target Composition | Cr concentration (at %) | Oxygen Concentration (%) | Film thickness (nm) | Target Composition | Cr concentration (at%) | Oxygen concentration (%) | Film thickness (nm) | | | | | |
| 92.5[Co-23.5at%Cr-14at%Pt]-4SiO$_2$-2.5Co$_3$O$_4$ | 23.0 | 1.0 | 2.0 | 96[Co-25at%Cr-18at%Pt]-4SiO$_2$ | 25.0 | 10.0 | 4.0 | 16.0 | 644.6 | 183.0 | 32.0 | 16.3 |
| 93.5[Co-28.5at%Cr-18at%Pt]-4SiO$_2$-2.5Co$_3$O$_4$ | 28.0 | 0.5 | 3.0 | 95[Co-23at%Cr-18at%Pt]-5SiO$_2$ | 23.0 | 10.0 | 4.0 | 20.0 | 636.6 | 171.1 | 35.0 | 16.5 |

PERPENDICULAR MAGNETIC RECORDING MEDIUM (PMRM) AND MAGNETIC STORAGE DEVICE USING THE SAME

RELATED APPLICATIONS

The present application claims priority to a Japanese Patent Application filed Jul. 1, 2009, under Appl. No. 2009-157192, which is incorporated herein by reference.

FIELD OF THE INVENTION

The present invention relates to data storage systems, and more particularly, this invention relates to a perpendicular magnetic recording medium (PMRM) capable of recording large volumes of data, and magnetic recording devices incorporating PMRM.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The rapid increase in the volume of data handled by computers has furthered demand for increasing the capacity of hard disk devices as an auxiliary storage device. Moreover, with the increased use of hard disk devices in domestic electrical appliances, there is a strong demand for enhancing the capacity of and reducing the size of hard disk devices.

In typical systems, a perpendicular magnetic recording system forms recording bits with the magnetization of the recording medium perpendicular to the media plane. Magnetizations within adjacent recorded bits run parallel to one another in opposite directions, reducing the demagnetization field within magnetized transitional regions, media noise, and stabilizing recorded magnetization during high-density recording. A double layered PMRM with a soft magnetic underlayer functions as a return path for the magnetic flux provided between the substrate and the perpendicularly magnetized recording layer. A magnetic head, including a magnetic shield with an interposing non-magnetic layer, is provided on at least the trailing side of the main magnetic pole to improve the recording magnetic field gradient.

CoCrPt alloy which was conventionally used for longitudinal magnetic recording media was investigated for perpendicular magnetic recording media. In conventional recording layers, thermal phase separation is used to segregate non-magnetic material mainly comprising Cr from the grain boundaries and reduce noise. This process utilizes high concentrations of Cr to maximize noise reduction, with an undesirably high quantity of Cr remaining within the magnetic crystal grains. This high concentration of Cr in the magnetic crystal grains reduces magnetic anisotropic energy and stability of the recorded signal.

To resolve these problems and reduce noise, state-of-the-art recording media employ a granular structure wherein magnetic crystal grains are separated magnetically by segregating non-magnetic compounds such as oxides and/or nitrides around the magnetic crystal grains. In case of a recording layer composed of a CoCrPt alloy with oxygen and oxide added, where the template for oxide-grain boundary formation is formed on the underlayer, allowing oxides to separate easily from the magnetic crystal grains, a granular structure of oxides surrounding magnetic crystal grains enables magnetic separation in the recording layer. It is therefore possible to decrease the amount of Cr contained in the magnetic crystal grains, enabling noise to be reduced without reducing the magnetic anisotropic energy.

Current techniques for improving recording density in a perpendicular magnetic recording medium reduce the magnetic cluster size. This approach is limited because thermal instability occurs when recording density exceeds about 77.7 gigabits per square centimeter (approx 500 Gb/in$^2$).

One effective method of avoiding this instability is to use material with a large magnetic anisotropy in the perpendicular magnetic recording layer, and it is possible to increase the magnetic anisotropy in the CoCrPt granular magnetic layer by reducing the Cr concentration. However, the difficulty with reducing the concentration of Cr occurs where segregation of oxide from the crystal grain boundary is insufficient, strengthening the exchange coupling between the magnetic grains so that the magnetic cluster size rapidly increases and the signal-to-noise ratio (SNR) deteriorates. Moreover, if the segregation of oxides to the grain boundary is promoted and magnetic grains become isolated, the switching field increases, making it impossible to record with the write magnetic field from the head.

Current state-of-the-art techniques reduce the magnetic field in which magnetization reversal occurs by thickening the non-granular magnetic layer which assists the magnetization reversal. However, there is an added difficulty with using this method in that non-granular magnetic layers have stronger lateral exchange coupling in the film plane than the granular layer, producing a larger magnetic cluster size with an increasing film thickness and deteriorating both resolution and the SNR. Therefore, a method and system for providing a perpendicular magnetic recording medium and a magnetic recording device which simultaneously satisfy the requirements for a high SNR, thermal stability, and write-ability would be very beneficial.

SUMMARY OF THE INVENTION

In one embodiment, a perpendicular magnetic recording medium (PMRM) includes a substrate; a soft magnetic underlayer formed above the substrate; an underlayer formed above the soft magnetic underlayer, the underlayer being for controlling orientation and segregation of the magnetic layer; a magnetic layer formed above the underlayer, the magnetic layer comprising mainly Co, Cr, Pt, and oxides thereof; and a ferromagnetic metal layer formed above the magnetic layer, the ferromagnetic metal layer comprising mainly Co, Cr, and Pt, wherein the ferromagnetic metal layer does not include oxides. The magnetic layer containing oxides comprises more than two magnetic layers, and a Cr concentration of magnetic layer adjacent to the ferromagnetic metal layer is between about 23 at. % and about 32 at. %, and a Cr concentration and a difference of Cr concentration between the adjacent layers are less than about 32 at. % and 25 at. % respectively at all magnetic layers which exist between the oxide-containing magnetic layer adjacent to the ferromagnetic metal layer and a oxide-containing magnetic layer formed bellow with the lowest Cr concentration among oxide-containing magnetic layers, the magnetic layer with the lowest Cr concentration has a granular structure in which oxides surround ferromagnetic grains therein; and a nucleation field is higher than about 159.2 kA/m.

In another embodiment, a PMRM includes a substrate; a soft magnetic underlayer formed above the substrate; an underlayer formed above the soft magnetic underlayer, the underlayer being for controlling orientation and segregation of the magnetic layer; a magnetic layer formed above the underlayer, the magnetic layer comprising Co, Cr, Pt, and oxides thereof, wherein the magnetic layer comprises at least three magnetic layers; and a ferromagnetic metal layer formed above the magnetic layer, the ferromagnetic metal layer comprising Co, Cr, and Pt, wherein the ferromagnetic metal layer does not include oxides. A Cr concentration of a magnetic layer adjacent to the ferromagnetic metal layer is between about 23 at. % and about 32 at. %, a Cr concentration of magnetic layers between the magnetic layer adjacent to the ferromagnetic metal layer and a magnetic layer having a lowest Cr concentration among the at least three magnetic layers is less than about 32 at. %, a difference between a Cr concentration of adjacent magnetic layers between the magnetic layer adjacent to the ferromagnetic metal layer and a magnetic layer having a lowest Cr concentration among the at least three magnetic layers is less than about 25 at. %, the magnetic layer having a lowest Cr concentration among the at least three magnetic layers has a granular structure in which oxides surround ferromagnetic grains therein, and a nucleation field is larger than about 159.2 kA/m.

Any of these embodiments may be implemented in a magnetic data storage system such as a disk drive system, which may include a magnetic head; a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 15 is a table illustrating the Cr concentration and differences between these concentrations for each of the layers in a first and second magnetic layer from various samples, according to one embodiment.

FIG. 16 is a table illustrating various properties from exemplary embodiments 2-1 to 2-7 and comparative examples 2-1 to 2-3, according to one embodiment.

FIG. 17 is a series of tables illustrating the Cr concentration, film thickness and oxygen concentration, Hs and -Hn, OW, and SNR for each layer of a structure from exemplary embodiments 3-1 to 3-13 and comparative examples 3-1 to 3-10, according to one embodiment.

FIG. 18 is a table comparing properties for various samples from exemplary embodiments 3-14 to 3-15, according to one embodiment.

DETAILED DESCRIPTION

Figure 1:
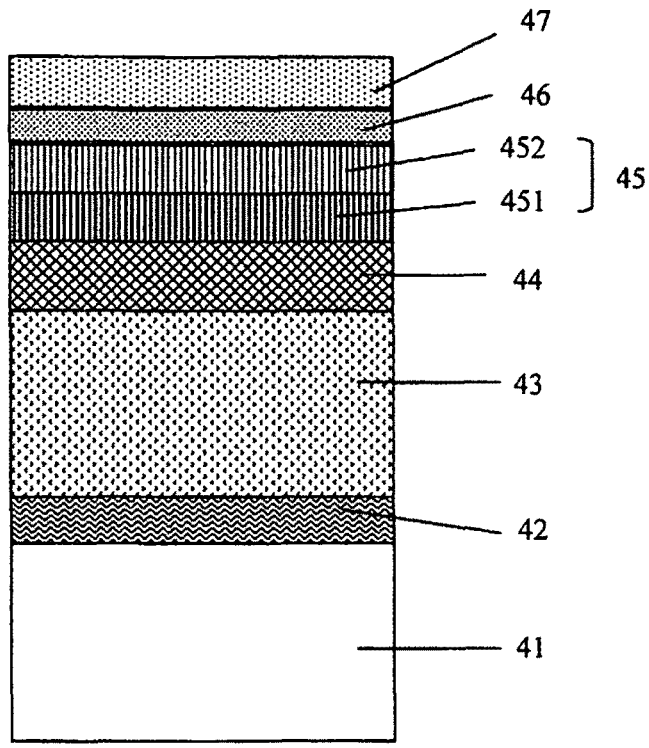
FIG. 1 is a cross-sectional view illustrating one particular embodiment of a perpendicular magnetic recording medium (PMRM).

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a perpendicular magnetic recording medium (PMRM) includes a substrate; a soft magnetic underlayer formed above the substrate; an underlayer formed above the soft magnetic underlayer; a magnetic layer formed above the underlayer, the magnetic layer comprising Co, Cr, Pt, and oxides thereof; and a ferromagnetic metal layer formed above the magnetic layer, the ferromagnetic metal layer comprising Co, Cr, and Pt, wherein the ferromagnetic metal layer does not include oxides. The underlayer controls orientation and segregation of the magnetic layer, the magnetic layer comprises a second magnetic layer nearer to the ferromagnetic metal layer than a first magnetic layer, the first magnetic layer having a granular structure in which oxides surround ferromagnetic grains therein, a Cr concentration of the second magnetic layer is between about 23 at. % and about 32 at. %, and a difference between the Cr concentration of the first magnetic layer and a Cr concentration of the second magnetic layer is less than about 25 at. %, and a nucleation field is higher than about 159.2 kA/m.

In another general embodiment, a PMRM includes a substrate; a soft magnetic underlayer formed above the substrate; an underlayer formed above the soft magnetic underlayer; a magnetic layer formed above the underlayer, the magnetic layer comprising Co, Cr, Pt, and oxides thereof and a ferromagnetic metal layer formed above the magnetic layer, the ferromagnetic metal layer comprising Co, Cr, and Pt, wherein the ferromagnetic layer does not include oxides. The underlayer controls orientation and segregation of the magnetic layer, the magnetic layer comprises at least three magnetic layers, a Cr concentration of a magnetic layer adjacent to the ferromagnetic metal layer is between about 23 at. % and about 32 at. %, Cr concentrations and a difference in Cr concentration in all magnetic layers which exist between the magnetic layer containing oxides adjacent to the ferromagnetic metal layer and a layer formed below with the lowest Cr concentration among the magnetic layer containing oxides is less than about 32 at. % and about 25 at. % respectively, and a magnetic layer having a lowest Cr concentration among the at least three magnetic layers comprising oxides has a granular structure in which oxides surround ferromagnetic grains therein, and a nucleation field is higher than about 159.2 kA/m.

A PMRM, according to one embodiment, has a soft magnetic underlayer formed on the substrate, an underlayer which controls the orientation and segregation of the magnetic layer, a magnetic layer of magnetic alloy material mainly comprising Co, Cr and Pt containing oxides, with a ferromagnetic metal layer mainly comprising Co, Cr and Pt not containing oxides formed on top of this. The magnetic layer containing oxides comprises a magnetic layer of two or more layers, and the Cr concentration in the layer adjacent to the ferromagnetic metal layer is between about 23 at. % and about 32 at. %, the Cr concentration in the magnetic layer between the magnetic layer containing oxides adjacent to the ferromagnetic metal and the layer formed below with the lowest Cr concentration among magnetic layers containing oxides is about 32 at. % or less, and moreover the difference in Cr concentration in all magnetic layers which exist between the magnetic layer containing oxides adjacent to the ferromagnetic metal layer and a layer formed below with the lowest Cr concentration among the magnetic layer containing oxides is about 25 at. % or less, and the magnetic layer with the lowest Cr concentration among the magnetic layers containing oxides has a granular structure in which oxides surround the ferromagnetic grains, and the nucleation field is about 159.2 kA/m or more.

Here the Cr concentration is the concentration found from the proportion of Cr with respect to the total amount of Co, Cr and Pt. Moreover, evaluation of the nucleation field (-Hn) is carried out using a Kerr effect measuring device at room temperature, with a measurement wavelength of 350 nm and a laser spot diameter of about 1 mm. The magnetic field was applied perpendicular to the film surface of the test material, with Kerr loop measurement being carried out with a maximum magnetic field of 1590 kA/m (approx 20 kOe) and a fixed sweep rate for 60 seconds. The nucleation field (-Hn) was taken as the magnetic field at a saturation value of 95% with the magnetic field reduced from a state where the Kerr rotation angle was positively saturated, and defined as positive when in the second quadrant. The results indicated that the larger this positive value, the better the thermal stability.

It is preferable that the nucleation field does not drop below 159.2 kA/m, as repeated losses of data occur at high temperatures, creating practical difficulties when incorporated into a magnetic recording device. With the improved thermal stability from the high magnetic anisotropy achieved with Cr concentrations at least 17 at. % or less and preferably 14 at. % or less in the layer with the lowest Cr concentration among the magnetic layers containing oxides, it is possible to realize a high signal-to-noise ratio (SNR) with a reduced cluster size due to the granular structure. Where the Cr concentration is less than 5 at. %, it is liable to cause a rapid increase in noise due to the very strong exchange coupling between the ferromagnetic grains in regions where grain boundary formation is insufficient. For this reason it is preferable that the Cr concentration in the layer with the lowest Cr concentration containing oxides should be 5 at. % or more.

By having a Cr concentration in the magnetic layer containing oxides adjacent to the ferromagnetic metal layer of between about 23 at. % and about 32 at. %, it is possible to weaken the interlayer coupling in the range over which there is no separation in the magnetization reversal of the ferromagnetic metal layer and the magnetic layer containing oxides adjacent to the ferromagnetic metal layer, the ferromagnetic metal layer making it more likely that magnetization reversal will be incoherent for the magnetic layer containing oxides adjacent to the ferromagnetic metal layer. Furthermore, the magnetization reversal mode in the magnetic layer containing oxides adjacent to the ferromagnetic metal layer tends to be incoherent. For this reason, magnetization reversal is more likely to occur in a ferromagnetic metal layer with a weak anisotropy field, the magnetization reversal of the ferromagnetic metal layer triggering magnetization reversal of the adjacent magnetic layer through interlayer coupling, leading to further magnetization reversal in the magnetic layer with the largest anisotropy field through interlayer coupling. As a result, magnetization reversal will take place in an external magnetic field with an average value less than the anisotropy field of the layers, enabling improvement in write-ability while maintaining high thermal stability. A region with a low anisotropy field is provided on the side of the magnetic layer containing oxides close to the head, and with this as a trigger for magnetization reversal it is possible to reduce the film thickness of the ferromagnetic metal film that has been necessary in prior art to ensure a sufficient write-ability. The ferromagnetic metal layer is a noise source with stronger lateral exchange coupling in the film plane than a granular layer, but as film thickness can be reduced, the magnetic cluster size is reduced, allowing a low noise (high SNR) to be realized. Furthermore, the angular dependency of the remanence coercivity (Hcr) is shallower, and it is possible to suppress the cross-erase when a write magnetic field is applied obliquely in the cross track direction.

At the same time, when the Cr concentration in the magnetic layer containing oxides adjacent to the ferromagnetic metal layer is higher than 32 at. %, magnetic anisotropy and saturation magnetization rapidly decrease making it effectively a non-magnetic region, the exchange coupling between the ferromagnetic metal layer falls virtually to zero and magnetization reversal separates, causing an increase in the saturation field and a severe deterioration in write-ability and resolution, with the result that the SNR also severely reduces.

Where the Cr concentration in magnetic layers containing oxides adjacent to the ferromagnetic metal layer is lower than 23 at. %, magnetic anisotropy and saturation magnetization increase and the interlayer exchange coupling with the ferromagnetic metal layer becomes too strong, with incoherent magnetization reversal becoming difficult to achieve (close to coherent magnetization reversal) in the ferromagnetic metal layer, and the average anisotropy field enlarges, increasing the saturation field. As a result, the magnetic field for writing sufficiently increases, and write-ability deteriorates. Where the ferromagnetic metal layer is too thick to achieve a sufficient write-ability, there is a deterioration in resolution, and noise increases due to the increase in the proportion of layers with strong exchange coupling. As a result it is impossible to obtain a high SNR. Furthermore, the angular dependency of the remanence coercivity (Hcr) is deeper compared to a situation in which the same write-ability is obtained, leading to the cross-erase when a write magnetic field is applied obliquely in the cross track direction, causing deterioration in track pitch density.

According to one embodiment, the difference in Cr concentration between adjacent magnetic layers in the magnetic layer present between the magnetic layer containing oxides adjacent to the ferromagnetic metal layer and the layer with the lowest Cr concentration among the magnetic layers containing oxides is kept to about 25% or less. Where the difference in Cr concentration between adjacent magnetic layers is larger than 25%, the magnetic anisotropy energy of the magnetic layer with the lowest Cr concentration becomes too large compared to the interlayer exchange coupling energy, meaning that the magnetization reversal of the magnetic layer with the lowest Cr concentration is no longer possible due to interlayer exchange coupling even where there is magnetization reversal in the ferromagnetic metal layer, resulting in a deterioration of write-ability. Where there is a separation in the magnetization reversal, resolution rapidly deteriorates, and SNR also significantly deteriorate.

With the magnetic layer containing oxides adjacent to the ferromagnetic metal layer, the provision of a gradient which ensures that the concentration of Cr oxides reduces toward the interface with the ferromagnetic metal layer creates a gradient such that magnetic anisotropy and saturation magnetization are reduced toward the interface with the ferromagnetic metal layer. In regions with a high concentration of Cr oxides, the exchange coupling between ferromagnetic grains is reduced through the segregation of Cr oxides to the grain boundary, contributing to reduced noise. Furthermore, magnetic anisotropy is improved along with thermal stabilization. Segregation is suppressed in regions with a low concentration of Cr oxides, and saturation magnetization and magnetic anisotropy are reduced enabling write-ability to improve. As the saturation magnetization is small, it is possible to suppress increases in noise even where segregation is inadequate. Regions with a low concentration of Cr oxide have a narrow oxide grain boundary, and crystal orientation of the ferromagnetic metal layer which forms on this is improved, improving the effect of the reduction in switching filed distribution. As a result it is possible to have a thinner film for the ferromagnetic metal layer, contributing to reduced noise, improved resolution and better write-ability.

For layers with the lowest Cr concentration amongst the magnetic layers containing oxides a granular film can be used whose main component is Co and which includes oxides containing at least Cr and Pt, for example, which includes at least two kinds of oxides selected from Si, Ti, Ta, Nb and B oxides and Co—Cr—Pt alloy, Co—Cr—Pt—B alloy, Co—Cr—Pt—Mo alloy, Co—Cr—Pt—Nb alloy, or Co—Cr—Pt—Ta alloy. By this means, it is possible to form a uniform crystal grain boundary over a wide area, and to suppress an increase in exchange coupling even where the Cr concentration in the magnetic layers is reduced. These oxides may be included in targets in the form of oxides, and can be formed by being included as a metal with reactive sputtering in an atmosphere of oxygen. Where a Co oxide is contained in the target, the oxide of Co is unstable due to low oxide formation reactivity, so it becomes an oxygen supply source by decomposing into Co and oxygen in the sputtering. The oxygen supplied here oxidizes the Si, Ti, Ta, Nb, B and Cr and promotes segregation to the grain boundary. Compared to the case where oxygen is supplied externally as the sputter gas, a uniform distribution can be achieved in the radial and circumferential direction of the substrate, improving the uniformity of magnetic characteristics and contributing to a reduction in switching field distribution. As it is possible to supply oxygen with decomposition occurring together with the sputtering, grain boundary formation in the initial layer can be promoted allowing noise to be reduced. CoO and $Co_3O_4$ or the like can be used as the Co oxide, but $Co_3O_4$ is effective as it most easily discomposes and contains the most oxygen. Where $Co_3O_4$ is contained in the target, it will be sufficient to use a quantity of around 1.5-3 mol %.

For the layer closest to the ferromagnetic metal layer among the magnetic layers containing oxides, a granular film can be used whose main component is Co and which includes oxides containing at least Cr, for example, which includes at least one of Si oxide, Ta oxide, Nb oxide, Ti oxide and Co—Cr alloy, Co—Cr—B alloy, Co—Cr—Mo alloy, Co—Cr—Nb alloy, Co—Cr—Ta alloy, Co—Cr—Pt—B alloy, Co—Cr—Pt—Mo alloy, Co—Cr—Pt—Nb alloy, or Co—Cr—Pt—Ta alloy. From the point of view of crystal growth of the ferromagnetic metal layer on it, the total quantity of oxides is preferably lower than that for magnetic layers formed below with large magnetic anisotropy. In the initial stages of film formation oxygen is supplied as the sputter gas, but by ceasing the supply of oxygen halfway through, it is possible to create a concentration gradient for Cr oxides. In contrast to the case where a magnetic layer is formed with a large magnetic anisotropy, from the point of view of forming a concentration gradient of Cr oxides it is preferable to have a lesser amount of Co oxides contained in the target than in the magnetic layers formed below which contain oxides. Co oxides have the effect of improving the uniformity of the magnetic characteristics, and so it is possible to use a quantity of around 1 mol % where $Co_3O_4$ is included in the target.

Magnetic layers containing oxides can have a structure of 3 or more layers. In this case, the Cr concentration in the magnetic layer adjacent to the ferromagnetic metal layer is held between 23% and 32%, and the difference in the Cr concentration between the adjacent magnetic layers and a Cr concentration of the magnetic layers are held to 25% or less and 32% or less, respectively, for magnetic layers between the layer in which the Cr concentration is lowest and the magnetic layer adjacent to the ferromagnetic metal layer, it is possible to achieve a suitable exchange coupling between the layers to promote incoherent magnetization reversal while suppressing separation of magnetization reversal in the magnetic layers, enabling a high write-ability. It is also possible to realize a high SNR through the provision of a granular structure in which the oxides surround the ferromagnetic grains for the magnetic layer with the lowest Cr concentration.

At least two types of oxide selected from Si, Ti, B, Ta, Nb are preferably used as the oxides forming the granular structure of the magnetic layer with the lowest Cr concentration to suppress sub-grain generation and form a uniform grain boundary. As the influence of non-uniformity in the microstructure is liable to increase where the Cr concentration of the magnetic layer with the lowest Cr concentration is less than 5 at. %, it is preferably 5 at. % or more. It is also possible to realize high thermal stability by having the nucleation field (-Hn) at 159.2 kA/m (approx 2 kOe) or greater. The Cr concentration in the magnetic layer with the lowest Cr concentration may be kept at least 17 at. % or less.

For magnetic layers between the magnetic layers containing oxides adjacent to the ferromagnetic metal layer and granular layers with a large magnetic anisotropy where Cr concentration is the lowest, a granular film can be used whose main component is Co and which includes oxides containing at least Cr and Pt, for example, which includes oxides and Co—Cr—Pt alloy, Co—Cr—Pt—B alloy, Co—Cr—Pt—Mo alloy, Co—Cr—Pt—Nb alloy or Co—Cr—Pt—Ta alloy. When forming these layers, it is preferable to have Co oxides included in the target. By this means, the Co oxide becomes an oxygen supply source by decomposing into Co and oxygen in the sputtering, a uniform distribution can be achieved in the radial and circumferential direction of the substrate, improving the uniformity of magnetic characteristics, contributing to a reduction in switching field distribution and promoting grain boundary formation in the initial layer, allowing noise to be reduced. CoO and $Co_3O_4$ or the like can be used as the Co oxide, but $Co_3O_4$ is effective as it most easily discomposes and contains the most oxygen. Where $Co_3O_4$ is contained in the target, it will be sufficient to use a quantity of around 1.5-3 mol %.

For the material which forms the ferromagnetic metal layer, multilayers of Co/Pt or Co/Pd can be used, or a CoCr alloy whose main component is Co and at least containing Cr. In particular, the use of an alloy whose main component is Co containing at least Cr, Pt and B suppresses the increase in noise to the lowest limit and allows switching field distribution to be reduced, and is preferable as it improves thermal stability and resistance to corrosion. For example it is possible to use Co—Cr—Pt alloy, Co—Cr—Pt—B alloy, Co—Cr—Pt—Mo alloy, Co—Cr—Pt—Mo—B alloy, Co—Cr—Pt—Nb—B alloy, Co—Cr—Pt—Ta—B alloy, Co—Cr—Pt—Cu—B alloy and the like.

The ferromagnetic metal layer plays the role of reducing the intensity and distribution of the switching field, and roughly the same effect can be obtained if the product of saturation magnetization and film thickness are kept constant. However, where the saturation magnetization becomes smaller, it is necessary to increase film thickness to obtain the above effect, leading to deterioration in resolution and increased noise at high linear recording densities. Moreover, as the write magnetic field reduces with an increase in the distance between the head and the soft magnetic layer, writeability deteriorates even with the same switching field. For this reason, the film thickness of the ferromagnetic metal layer should be thinner, and preferably less than 5 nm. More preferably, it should be less than 4 nm. Moreover, it is also possible to form the ferromagnetic metal layer with a laminated structure of two or more layers of the above material.

The underlayer which controls orientation and segregation controls the crystal orientation and crystal grain diameter of the recording layer, and plays an important role in reducing exchange coupling between crystal grains in the recording layer. The film thickness of the underlayer structure and material may be set within a range for which the above effect can be obtained. For example, it is possible to use structures with a nanocrystalline layer of Ta or the like, an amorphous layer of NiTa or the like, or a structure in which an Ru or Ru alloy layer is formed on a metal layer having a face-centered cubic (fcc) lattice structure or an Ru alloy formed on a Ti alloy via an fcc metal.

The function of a nanocrystalline layer of Ta or the like, an amorphous layer of NiTa or the like, or a metal layer having a face-centered cubic (fcc) lattice structure is to improve the c-axis orientation in the direction perpendicular to the Ru film surface. In particular, fcc metals have a superior ability to control the grain diameter and roughness compared to nanocrystals such as Ta or the like or amorphous materials such as NiTa, and are preferable as they can greatly improve thermal stability and promote segregation in the recording layer. Metals which have a face centered cubic (fcc) lattice structure that can be used are Pd, Pt, Cu, Ni and alloys containing these. In particular, alloys whose main component is Ni and containing at least W, Cr, V or Cu are preferable as they are capable of forming a suitable grain diameter and roughness and can promote segregation in the recording layer. For example Ni-6 at. % W alloy, Ni-8 at. % W alloy, Ni-6 at. % V alloy, Ni-10 at. % Cr alloy, Ni-10 at. % Cr-6 at. % W alloy, Ni-10 at. % Cr-3 at. % Nb alloy, Ni-10 at. % Cr-3 at. % B alloy, Ni-20 at. % Cu alloy, Ni-20 at. % Cu-6 at. % W, Ni-20 at. % Cu-3 at. % Ti alloy, Ni-20 at. % Cu-3 at. % Ta alloy and the like. The value for film thickness is normally in the range of from 2 nm to 10 nm.

It is preferable that an amorphous layer of Cr—Ti alloy, Cr—Ta alloy, Ni—Ta alloy, Al—Ti alloy or the like be provided directly below the fcc metal, as it is possible to improve the orientation of the fcc layer (111). Film thickness will normally be in the range of 1 nm to 5 nm.

The role of the Ru alloy layer is to control the crystal grain diameter and crystal orientation of the recording layer and reduce exchange coupling between the crystal grains. If the film thickness is within a range that satisfies this, a value can normally be set in the range of 3 nm to 30 nm. The formation of the Ru layer in two or more layers, the lower Ru layer being formed at a low gas pressure and high rate, with the upper Ru layer formed at a high gas pressure and low rate is preferable as it suppresses deterioration in orientation and promotes segregation in the recording layer. Ar may be used as the sputter gas, and it is also possible to use Ar to which minute quantities of oxygen or nitrogen have been added. Moreover, having a granular film in which oxides or nitrites surround the Ru at the interface of the Ru layer and the recording layer is preferable as it further promotes segregation in the magnetic layer. The granular film is formed with reactive sputtering using argon gas to which minute quantities of oxygen or nitrogen are added and an alloy with Ru as the main component containing elements which oxidize easily such as Si, B, Ti, Ta and Nb, enabling a granular film to be formed using a target in which oxides such as $SiO_2$, $TiO_2$, $Ta_2O_5$, $Nb_2O_5$ and the like have been included in the Ru.

Alloys such as FeCoTaZr, FeCoTaZrCr, CoTaZr, CoTaZrCr, FeCoB, FeCoCrB, CoNbZr, and CoTaNb alloy can be used for the material which forms the soft magnetic underlayer that functions as a return path for the flux from the head. The soft magnetic underlayer can have a 3-layer structure in which the soft magnetic alloy layers are laminated through a thin Ru layer, enabling control of the recording width and write-ability by controlling coupling between the soft magnetic layers using the film thickness of Ru. Moreover, it is also possible to employ a structure with a pinning layer provided to pin the magnetic domain of the soft magnetic underlayer below the soft magnetic underlayer comprising soft magnetic material of a layer of FeCoTaZr or the like, or a structure in which a pinning layer is provided below a structure where the soft magnetic alloy layers are anti-ferromagnetically coupled (AFC structure) to each other via a thin layer of Ru.

Exemplary embodiments of the invention are described below in detail with reference to the drawings.

Exemplary Embodiment 1

FIG. 1 shows a schematic cross-section illustrating an Exemplary embodiment of a perpendicular magnetic recording medium (PMRM). The PMRM, according to one embodiment, was fabricated using a sputtering device. After evacuating all of the process chambers to a vacuum of less than $1 \times 10^{-5}$ Pa, the process was carried out in sequence by moving a carrier onto which a substrate was loaded through all the process chambers. Layers other than the protective layer were formed using a DC magnetron sputter.

A glass substrate with a diameter of 63.5 mm was used for the substrate 41. Underlayer 42, with a film thickness of 30 nm comprising an NiTa alloy, was formed on substrate 41 to increase adhesion to the substrate 41. Ni-37.5 at. % Ta was used as the NiTa alloy. Underlayer 42 is not necessarily required, and Ni alloy, Co alloy, Al alloy and the like may also be used, along with alloys thereof and/or a plurality of layers. For example, AlTi alloy, NiAl alloy, CoTi alloy, AlTa alloy and the like may be used.

Soft magnetic underlayer 43 was then made in a laminated 3-layer structure where FeCoTaZr alloy layers are stacked through a thin Ru layer. 51 at. % Fe-34 at. % Co-10 at. % Ta-5 at. % Zr was used as the FeCoTaZr alloy. The film thickness of the FeCoTaZr alloy was 15 nm per layer, and the thickness of the Ru layer was 1.2 nm. Underlayer 44 which controls the orientation and segregation of the recording layer had a structure formed sequentially from an Ni-37.5 at. % Ta layer with a film thickness of 4 nm, an Ni-6 at. % W layer with a film thickness of 8 nm, a Ru layer with a film thickness of 16 nm, and a layer comprising Ru and Ti-oxide with a thickness of 1 nm.

Underlayer 44 controls the crystal orientation and crystal grain diameter of the recording layer, and plays an important role in reducing exchange coupling between crystal grains in the recording layer. The film thickness, structure and material of underlayer 44 may be set within the range over which the above effect is obtained, and there is no particular restriction on film thickness, structure and material.

In the Exemplary embodiment, the Ru layer of underlayer 44 was formed in two separate layers, with the lower half being formed at a gas pressure of 1 Pa, a film-forming rate of 2 nm/s, and the upper half at a gas pressure of 5.5 Pa and a film-forming rate of 2 nm/s. Film comprising a Ru—Ti oxide used a Ru-10 at. % Ti target and was formed with reactive sputtering in a 3% atmosphere of oxygen at a total gas pressure of 3 Pa.

Magnetic layer 45 has a dual-layer structure comprising first magnetic layer 451 and second magnetic layer 452. First magnetic layer 451 was formed with a composite target comprising 3 types of oxide $SiO_2$, $TiO_2$ and $Co_3O_4$ and a CoCrPt alloy using the targets shown in the table in FIG. 15 with the Cr concentration changed, at a sputtering rate of 3 nm/s and a film thickness of 4.5 nm. For the first 1 second the total gas pressure for the argon-oxygen mixed gas was 5 Pa and the concentration of oxygen was 1.0%, and for the remaining 0.5 seconds the total gas pressure was 4 Pa formed using argon gas alone. The substrate bias was −350 V. As $Co_3O_4$ is unstable compared to $SiO_2$ and $TiO_2$, it is discomposed during sputtering to become a source of oxygen, supplementing the lack of uniformity in the oxygen gas supplied as the sputter gas, and contributing to uniformity in magnetic characteristics.

Second magnetic layer 452 was formed with a composite target comprising CoCrPt alloy and $SiO_2$ using the targets shown in the table in FIG. 15 with the Cr concentration changed, and a film thickness of 7.5 nm. It was formed with changes to the sputter gas conditions in the sputtering. For the first 1 second the total gas pressure for the argon-oxygen mixed gas was 1.5 Pa and the concentration of oxygen was 10%, and for the remaining 1.5 seconds the total gas pressure was 0.8 Pa using argon only. By this means it was possible to confirm the significant presence of Cr oxides in the lower, part of second magnetic layer 452, with a reduced proportion of Cr oxides in the upper layer, showing a tendency for the proportion of the metal Cr present to increase.

For ferromagnetic metal layer 46, which does not contain oxides, a 66 at. % Co-10 at. % Cr-14 at. % Pt-10 at. % B alloy with a film thickness of 2.5 nm was used, with argon used as the sputter gas, and a total gas pressure of 0.6 Pa. In the ferromagnetic metal layer 46, it is also possible to use materials such as CoCr alloy and CoCr alloy with added Pt, Ta, Mo, Nb, Cu and B, and roughly the same effect can be obtained if the product of saturation magnetization and film thickness are kept constant. However, as the film thickness increases there is the danger of deterioration in resolution and a drop in the write magnetic field generated from the head, so a thickness of less than 5 nm is suitable.

Next, a DLC (Diamond-Like Carbon) film was formed with a thickness of 3.0 nm as the protective film 47. An organic lubricant was coated on its surface to form a lubricating layer.

Chemical composition analysis of the magnetic layer used X-lay photoelectron spectroscopy (XPS) to penetrate in the depth direction for the sputter from the sample surface with a 500 V accelerated voltage ion gun, analyzing over a range with a depth of 1.5 mm and width of 0.1 mm using an Al Kα line as an x-ray source, the ratio of the various elements contained being found by detecting the energy spectra in vicinities corresponding respectively to the C $1s$ electron, the O $1s$ electron, the Si $2s$ electron, the Cr $2p$ electron, the Co $2p$ electron, the Ru $3d$ electron, the Pt $4f$ electron and the like. The Cr concentration of the magnetic layer was found as the proportion of Cr with respect to the total amount of Co, Cr and Pt. When estimating the amount of Cr oxide, the proportion of Cr metal and Cr oxide was estimated from the chemical shift of the Cr spectrum.

The evaluation of the magnetic characteristics was done using a Kerr effect measurement device at room temperature. The measurement wavelength was 350 nm, the spot diameter of the laser was approximately 1 mm. The magnetic field was applied perpendicular to the film surface of the test material, with Kerr loop measurement being carried out with a maximum magnetic field of 1590 kA/m (approximately 20 kOe) and a fixed sweep rate for 60 seconds. Values for coercivity (Hc), saturation field (Hs) and nucleation field (-Hn) were then found. The saturation field (Hs) was defined as the magnetic field when the Kerr rotation angle reached 99% of the saturated value when increasing the magnetic field from 0 to 1590 kA/m (approximately 20 kOe). -Hn was taken as the magnetic field at a saturation value of 95% with the magnetic field reduced from a state where the Kerr rotation angle was positively saturated, and defined as positive when in the second quadrant. This value showed good thermal stability when positive and larger.

In the evaluation of recording performance, playback signal and noise was measured under the conditions of rotation speed of 11 m/s, skew angle of 0°, and a magnetic spacing of approximately 3 nm, and the S/N (signal to noise ratio) of the medium was evaluated using the ratio of playback signal and medium noise at a linear recording density of 33464 fr/mm (flux rotation/mm, approximately 850 kFCI). For evaluation of write-ability, the overwrite (OW) characteristics were evaluated by overwriting a signal of 6693 fr/mm on a signal of 33464 fr/mm and taking the signal intensity ratio of the remaining components of the 33464 fr/mm signal and the 6693 fr/mm (170 kFCI) signal.

The reader of the magnetic head employed a read element which uses a shield gap of length 30 nm and a tunneling magnetoresistive (TMR) element with a track width of 40 nm. The writer of the magnetic head comprises a single-pole-type writer having a main pole, an auxiliary pole and a thin-film conductor coil, the main pole comprising a yoke part of main pole and a pole tip of a main pole, with a shield being formed to cover the cross-track and down-track direction of the main magnetic pole tip (wraparound shielded head). The head used had a geometrical track width for the pole tip of a main pole of 60 nm, a distance between the main magnetic pole and the trailing shield of 30 nm, and a distance between the main pole and side shield of 100 nm. The Cr concentration and differences between them for each of the layers included in first magnetic layer 451 and second magnetic layer 452 from samples 1-1 to 1-42 is shown in the table in FIG. 15.

Figure 2:
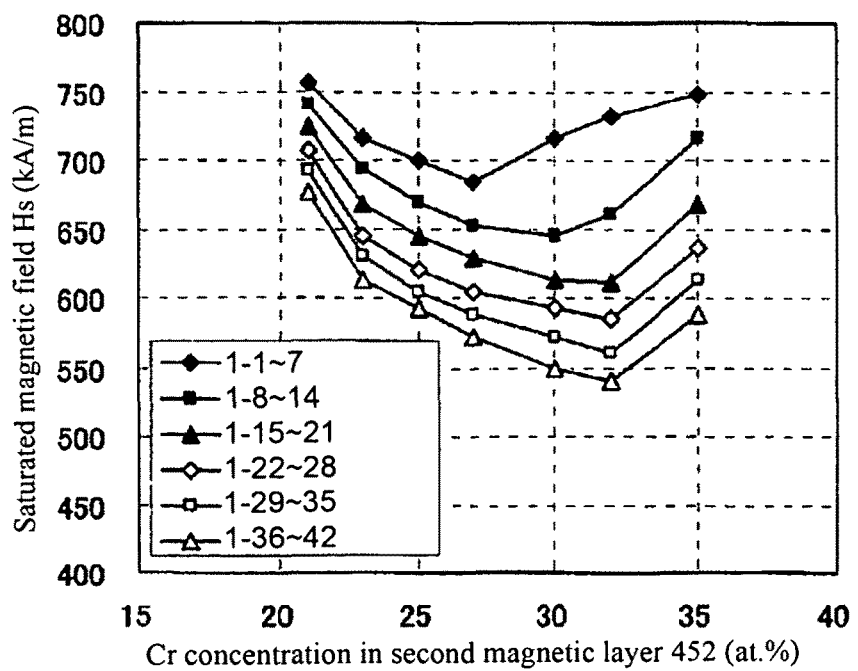
FIG. 2 is a diagram showing the relationship between saturation field Hs and Cr concentration in the second magnetic layer, according to one embodiment.
Figure 4:
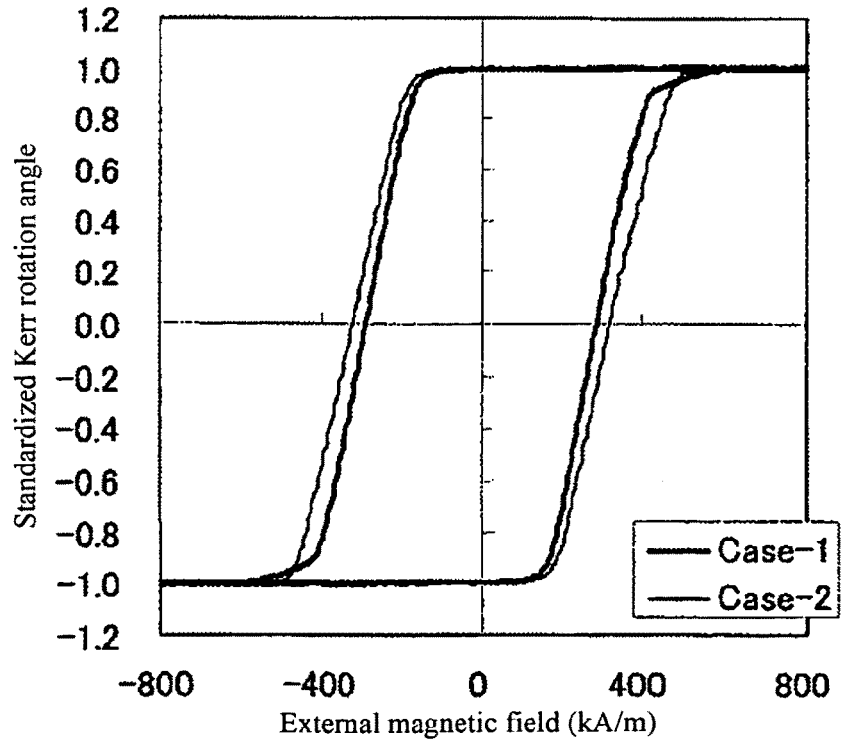
FIG. 4 is a diagram illustrating a typical example of Kerr loops where magnetization reversal is united and separate, according to one embodiment.

FIG. 2 shows the relationship between the saturation field of the recording layers comprising magnetic layer 45 and ferromagnetic metal layer 46 and the Cr concentration of second magnetic layer 452, according to one embodiment. It is clear that where the Cr concentration of the second magnetic layer is increased with the Cr concentration of the first magnetic layer 451 fixed, the saturation field (Hs) decreases with the increase in Cr concentration of the second magnetic layer 452 before increasing again once it has reached a minimum value. A typical curve for the Kerr loop with the Cr concentration around the minimum value taken by saturation field (Hs) is shown in FIG. 4.

The shape of the Kerr loop indicates that the normal magnetization reversal occurs without magnetization of each layer separated from each other where the Cr concentration of second magnetic layer 452 is lower than the Cr concentration with the saturation field at the minimal value (Case 2), but where the Cr concentration of second magnetic layer 452 is higher than the Cr concentration with the saturation field at the minimum value (Case 1) the shape of the Kerr loop indicates that magnetization reversal occurs separately for ferromagnetic metal layer 46 and magnetic layer 45. It is clear from FIG. 2 that to ensure that magnetization reversal does not occur separately, it is necessary to keep the Cr concentration in the second magnetic layer below 32 at. % at least.

Figure 3:
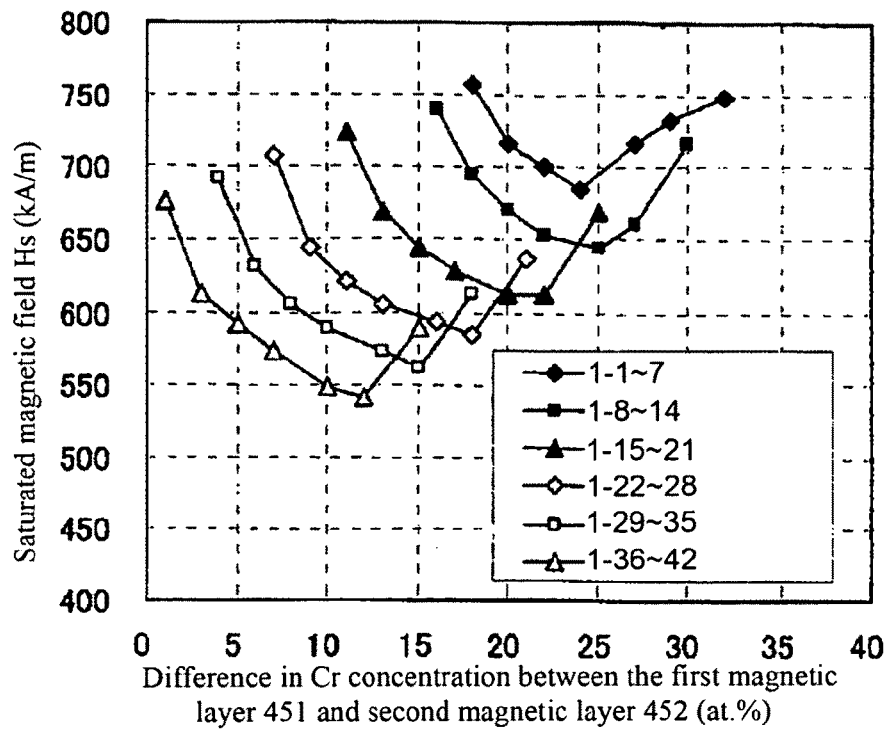
FIG. 3 is a diagram expressing the relationship between the difference in Cr concentration in the first magnetic layer and second magnetic layer and the saturation field Hs, according to one embodiment.

The total magnetic anisotropy of the magnetic layers decreases due to the fact that the magnetic anisotropy of second magnetic layer 452 decreases with increasing the Cr concentration of second magnetic layer 452. Moreover interlayer exchange coupling between ferromagnetic metal layer 46 and second magnetic layer 452 and between first magnetic layer 451 and second magnetic layer 452 decreases due to a decrease in the magnetic anisotropy and saturation magnetization of second magnetic layer accompanying an increase in the Cr concentration of the second magnetic layer, indicating a tendency for the incoherent magnetization reversal to increase. By applying a concentration gradient to second magnetic layer 452 so that the concentration of Cr oxides on the ferromagnetic metal layer 46 side is low, it is possible to have a gradient so that the saturation magnetization and magnetic anisotropy reduce in the ferromagnetic metal layer, and the interlayer coupling between the ferromagnetic metal layer and second magnetic layer 452 becomes smaller. Where the values are lower than the Cr concentration at the minimal value for the saturation field, the magnetization reversal of the magnetic layers is united without separation from the first magnetic layer to the ferromagnetic metal layer, but the interlayer exchange coupling between the ferromagnetic metal layer and the second magnetic layer decreases with an increase in the Cr concentration in the second magnetic layer. For this reason magnetization reversal is more likely to occur in the ferromagnetic layer with a low anisotropy field, with magnetic reversal of the second magnetic layer with the next lowest anisotropy field occurring through interlayer coupling triggered by magnetization reversal of the ferromagnetic metal layer, and then with magnetization reversal of first magnetic layer 451 which has the largest anisotropy field occurring through interlayer coupling between first magnetic layer 451 and second magnetic layer 452. This indicates that magnetization reversal will occur with an external field smaller than the value for the average anisotropy field of the layers, and saturation field will reduce.

Where the Cr concentration of the first magnetic layer is 10 at. % or more, it appears that the behavior of the magnetization reversal changes around the point where Cr concentration of the second magnetic layer is 32 at. %. Where the Cr concentration exceeds 32 at. %, the magnetic anisotropy of second magnetic layer 452 rapidly decreases, effectively becoming a non-magnetic region, and the exchange coupling with the ferromagnetic metal layer 46 rapidly decreases indicating that magnetization reversal has separated.

Where the Cr concentration in the first magnetic layer 451 is 5 at. % or less, it is clear from FIG. 2 that the saturation field (Hs) turns to increase where the Cr concentration in the second magnetic layer is less than 32 at. % as the Cr concentration in the second magnetic layer increases from 21 at. %. As shown in FIG. 4, where the Cr Concentration of the second magnetic layer 452 is lower than the Cr concentration with the saturation field has a minimal value, a Kerr loop forms as shown in Case 2 in FIG. 4, indicating that magnetization reversal occurs without magnetization of each layer separated from each other. On the other hand, where the Cr concentration of second magnetic layer 452 is higher than the Cr concentration where the saturation field has a minimum value, a Kerr loop of the type shown in Case 1 in FIG. 4 forms, indicating that magnetization reversal occurs separately. This indicates that where the magnetic anisotropic energy of the first magnetic layer 451 is much larger than the exchange coupling energy acting between the second magnetic layer 452 and first magnetic layer 451, the magnetization of first magnetic layer 451 cannot reverse via the interlayer exchange coupling even if ferromagnetic metal layer 46 reverses. In order to obtain a sufficient exchange coupling between the layers, it is preferable to have the difference between the magnetic anisotropy energy less than a set value, and from FIG. 3 the difference in Cr concentration between first magnetic layer and second magnetic layer is 25 at. % or less.

Figure 5:
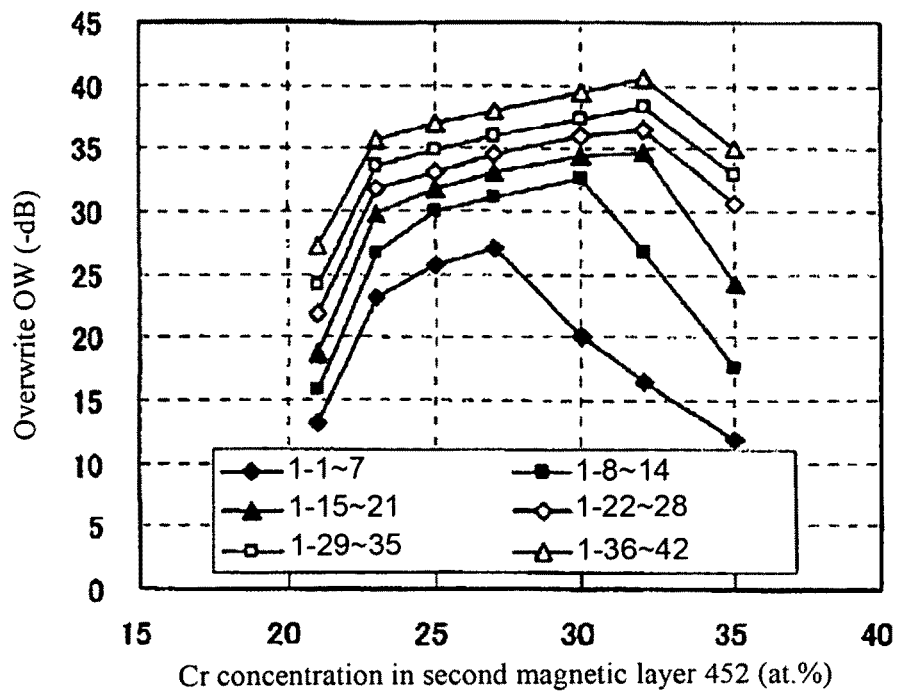
FIG. 5 is a diagram illustrating the relationship between overwrite and Cr concentration in the second magnetic layer, according to one embodiment.
Figure 6:
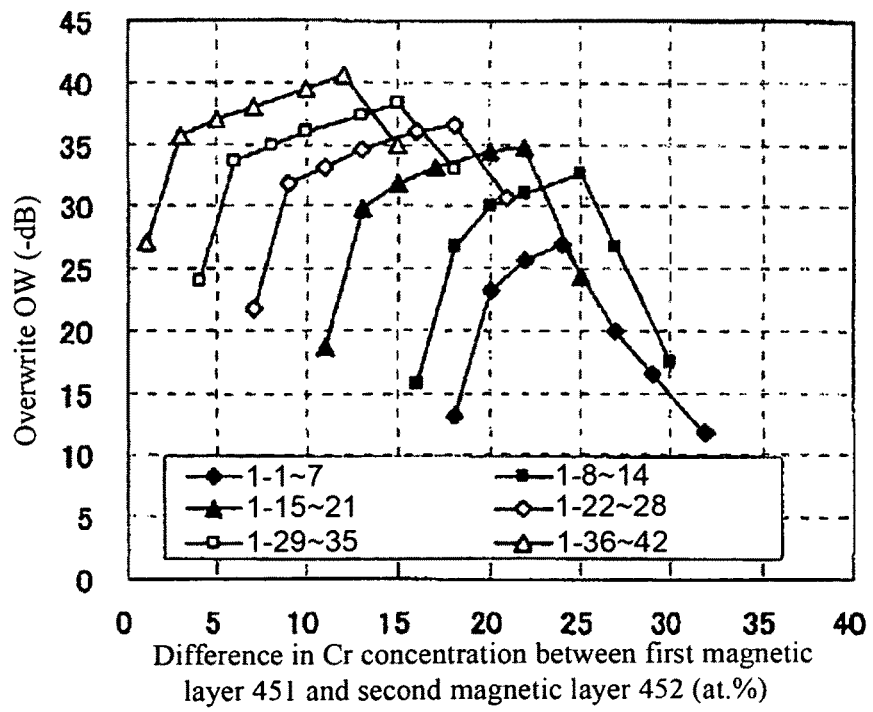
FIG. 6 is a diagram illustrating the relationship between the difference in Cr concentration in the first magnetic layer and second magnetic layer and overwrite, according to one embodiment.

The severe deterioration in overwrite characteristics corresponding to the increase in saturation field with the increase in Cr concentration in the second magnetic layer after the minimum value of saturation field has been reached can be clearly seen in FIG. 5, FIG. 6. In other words, to maintain an adequate write-ability it is necessary to keep the Cr concentration of the second magnetic layer at 32 at. % or less and moreover to keep the difference in the Cr concentration between the first magnetic layer and the second magnetic layer at 25 at. % or less. In this way, an incoherent magnetization reversal can be achieved with separation of the magnetization suppressed, and it is possible to obtain high write-ability. Moreover where the Cr concentration in the second magnetic layer is 23 at. % or less, it is clear that the overwrite inevitably deteriorates. This would seem to be because the magnetic anisotropy and saturation magnetization of the second magnetic layer increases as the Cr concentration decreases, the interlayer exchange coupling between the adjacent layer and ferromagnetic metal layer strengthens, making it more difficult for incoherent magnetization reversal to take place in the ferromagnetic metal layer, with the saturation field increasing due to the increased average value for the anisotropy field.

Figure 7:
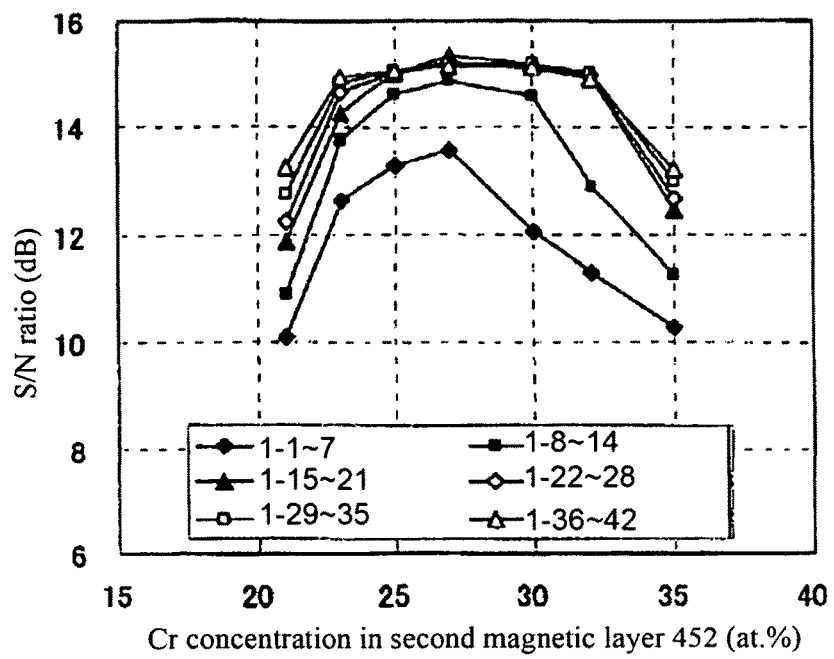
FIG. 7 is a diagram illustrating the relationship between SNR and Cr concentration in the second magnetic layer, according to one embodiment.
Figure 8:
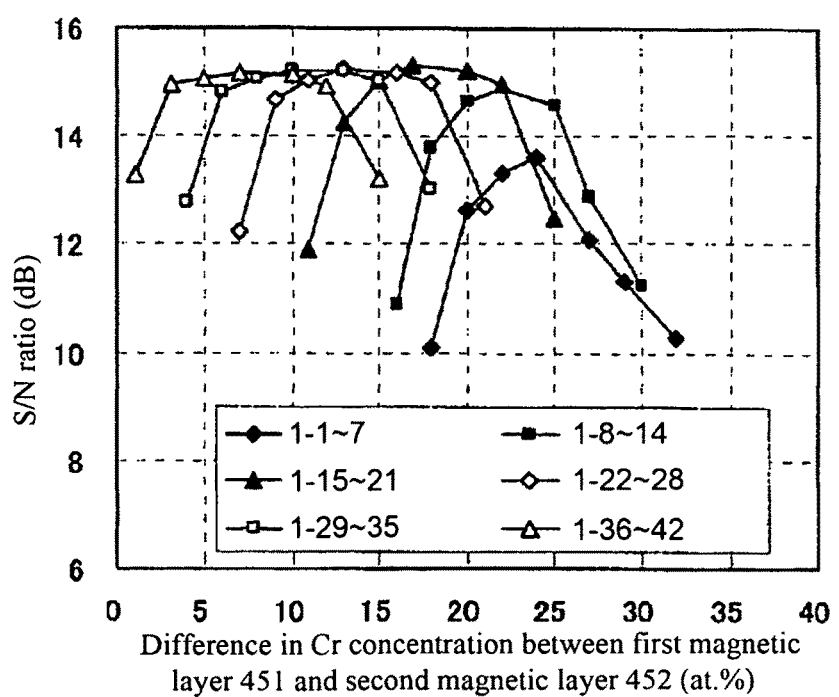
FIG. 8 is a diagram illustrating the relationship between the difference in Cr concentration between the first magnetic layer and second magnetic layer and the SNR, according to one embodiment.

FIG. 7 and FIG. 8 show the SNR. By comparing FIG. 7 and FIG. 8 with FIG. 5 and FIG. 6, it is clear that the SNR rapidly deteriorates where there is a deterioration in the overwrite (OW) characteristics with the magnetization reversal of magnetic layers separated. This is because in addition to the fact that OW characteristics deteriorate and an adequate recording cannot take place, the resolution rapidly deteriorates as the magnetization reversal of the magnetic layers containing oxides and the ferromagnetic metal layer is separate.

Where the Cr concentration of the second magnetic layer is less than 23 at. %, the SNR rapidly deteriorates. This indicates that with the Cr concentration of the second magnetic layer at less than 23 at. %, the interlayer exchange coupling between the second magnetic layer and the ferromagnetic metal layer strengthens, it becomes difficult for incoherent magnetization reversal to take place in the ferromagnetic metal layer, the OW characteristics deteriorate and adequate write-ability cannot be achieved due to the fact that the average value of the anisotropy field increases.

Figure 9:
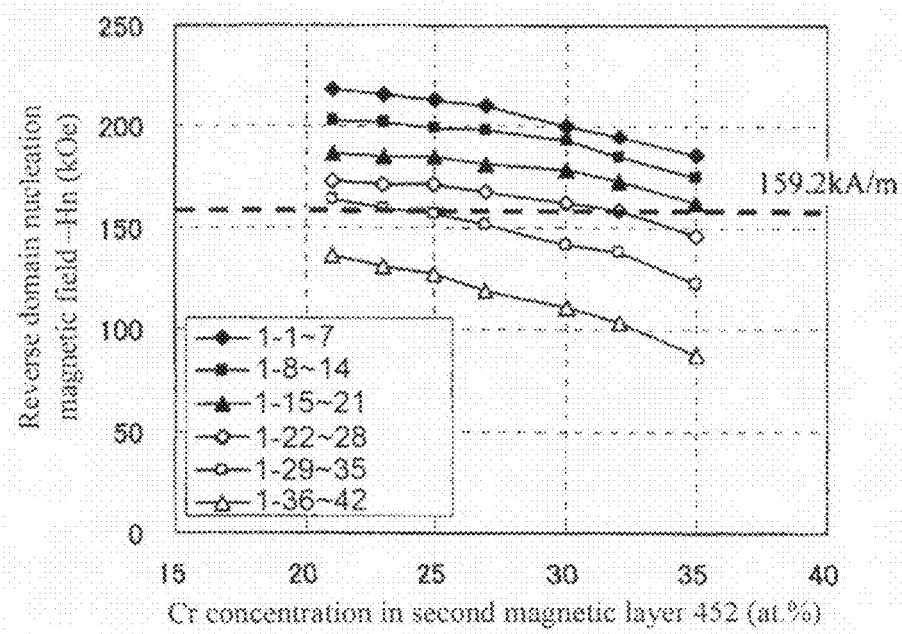
FIG. 9 is a diagram illustrating the relationship between nucleation field (-Hn) and the Cr concentration in the second magnetic layer, according to one embodiment.

FIG. 9 shows the nucleation field (-Hn) which is the indicator for thermal stability. From FIG. 9 it is clear that it is effective to use a material with a low Cr concentration and a large magnetic anisotropy as the first magnetic layer in order to obtain high thermal stability. Where the value of -Hn drops below 159.2 kA/m (approx 2 kOe) the deterioration in the signal (thermal demagnetization) at high temperatures above 60° C. is severe when incorporated in a magnetic recording device, with frequent losses of recorded data, causing difficulties in practical use. In order to obtain thermal stability with no practical problems, a Cr concentration in the first magnetic layer of at least 17 at. % or less is preferable, and it is clear that it is possible to obtain thermal stability with no practical issues with the Cr concentration of the second magnetic layer in the range between 23 at. % and 32 at. % by keeping the Cr concentration below 14 at. %. On the other hand, in the cases of sample 1-36 to 1-42 with the Cr concentration of the first magnetic layer more than 17 at. %, it was not possible to obtain thermal stability with no practical issues.

From the above results, it is possible to improve write-ability and SNR by keeping the concentration of Cr in the second magnetic layer between 23 at. % and 32 at. % and by keeping the difference in the Cr concentration between the first magnetic layer and the second magnetic layer at 25 at. % or less, and it is possible to achieve high thermal stability with no problems in practical applications when incorporated in a magnetic recording device by keeping the nucleation field at 159.2 kA/m (approx 2 kOe) or more.

Moreover, it is clear from FIG. 7 that with the Cr concentration in the first magnetic layer less than 5 at. %, the maximum value of the SNR deteriorates severely. This can be considered to be because as the saturation magnetization of the magnetized grains (core) in the first magnetized layer is extremely high, the magnetic cluster size rapidly increases due to very strong intergranular exchange coupling in regions where grain boundary formation is insufficient. In other words, it is preferable that the Cr concentration be kept at 5 at. % or above because where the Cr concentration in the first magnetic layer drops below 5 at. % the influence of lack of uniformity in the microstructure will be evident.

Exemplary Embodiment 2

The PMRM of this Exemplary embodiment was fabricated using the identical sputtering device to that described in Exemplary embodiment 1 with a layer structure and process conditions identical to that in Exemplary embodiment 1 with the exception of the first magnetic layer 451 and second magnetic layer 452. For comparison a sample was fabricated using a target with just one oxide when forming first magnetic layer 451, a sample using a target with no oxide, a sample using a target not containing an oxide when forming second magnetic layer 452 and a sample using a target not containing an oxide when making the first magnetic layer and second magnetic layer. Where using targets which did not contain oxide, argon gas alone was used for the sputtering gas, ensuring that no oxides were formed. The table in FIG. 16 shows the Cr concentration contained in the target composition and each layer. Here the Cr concentration in the first magnetic layer was 10 at. %, the Cr concentration in the second layer 25 at. %, with the Cr concentration difference between the first magnetic layer and the second magnetic layer 15 at. %.

It is clear from Exemplary embodiments 2-1 to 2-7 in the table in FIG. 16 that as in the case where $SiO_2$ and $TiO_2$ were used as oxides to form first magnetic layer, a high -Hn, OW and SNR can be obtained even where using $SiO_2$ and $B_2O_3$, $TiO_2$ and $B_2O_3$, $Ta_2O_5$ and $B_2O_3$, $Nb_2O_5$ and $B_2O_3$, $SiO_2$ and $Ta_2O_5$, and $SiO_2$ and $Nb_2O_5$. Moreover, it is clear that a high OW and SNR can be obtained even where using $TiO_2$, $B_2O_3$, $Ta_2O_5$, $Nb_2O_5$ or the composite oxides $SiO_2$ and $TiO_2$ in place of $SiO_2$ as the oxide forming the second magnetic layer. A value of 159.2 kA/m (approx 2 kOe) or more can be obtained for the nucleation field (-Hn), so there is no difficulty with thermal stability.

A comparison between Exemplary embodiment 2-1 in which the target contains $Co_3O_4$ and Exemplary embodiment 2-8 in which it does not shows that the magnetic characteristics such as Hs and Hn are virtually unchanged, but that the SNR for Exemplary embodiment 2-1 has a value that is approximately 0.9 dB higher. This indicates that the uniformity of the magnetic characteristics within the disk is better for Exemplary embodiment 2-1 which comprises $Co_3O_4$ in the target, and that this improves the SNR.

Figure 10:
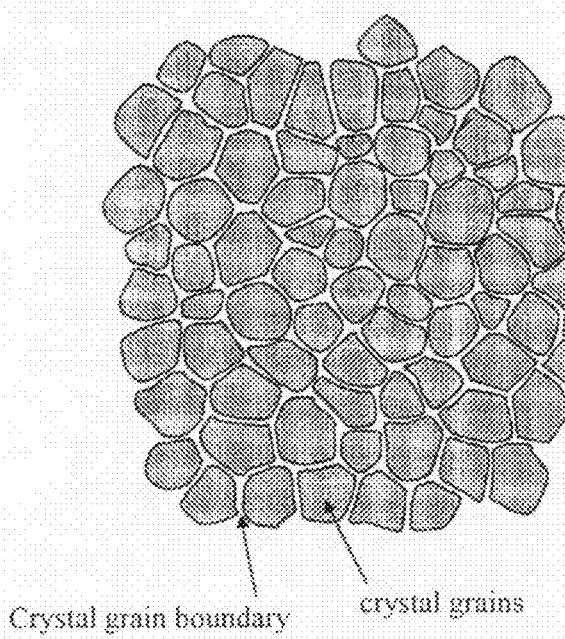
FIG. 10 is a schematic diagram showing the plan-view image, observed with a transmission electron microscope, of an Exemplary embodiment of the first magnetic layer in which the crystal grain boundary includes at least two oxides from among Si, Ti, B, Ta, Nb.

Samples with a structure in which the second magnetic layer and the ferromagnetic metal layer were removed from the samples of the Exemplary embodiment were prepared, and upon observation of the microstructure of the first magnetic layer with a transmission electron microscope a uniform grain boundary in which oxides surround the ferromagnetic crystal grains with a low amount of sub-grain was confirmed as shown in FIG. 10.

Figure 11:
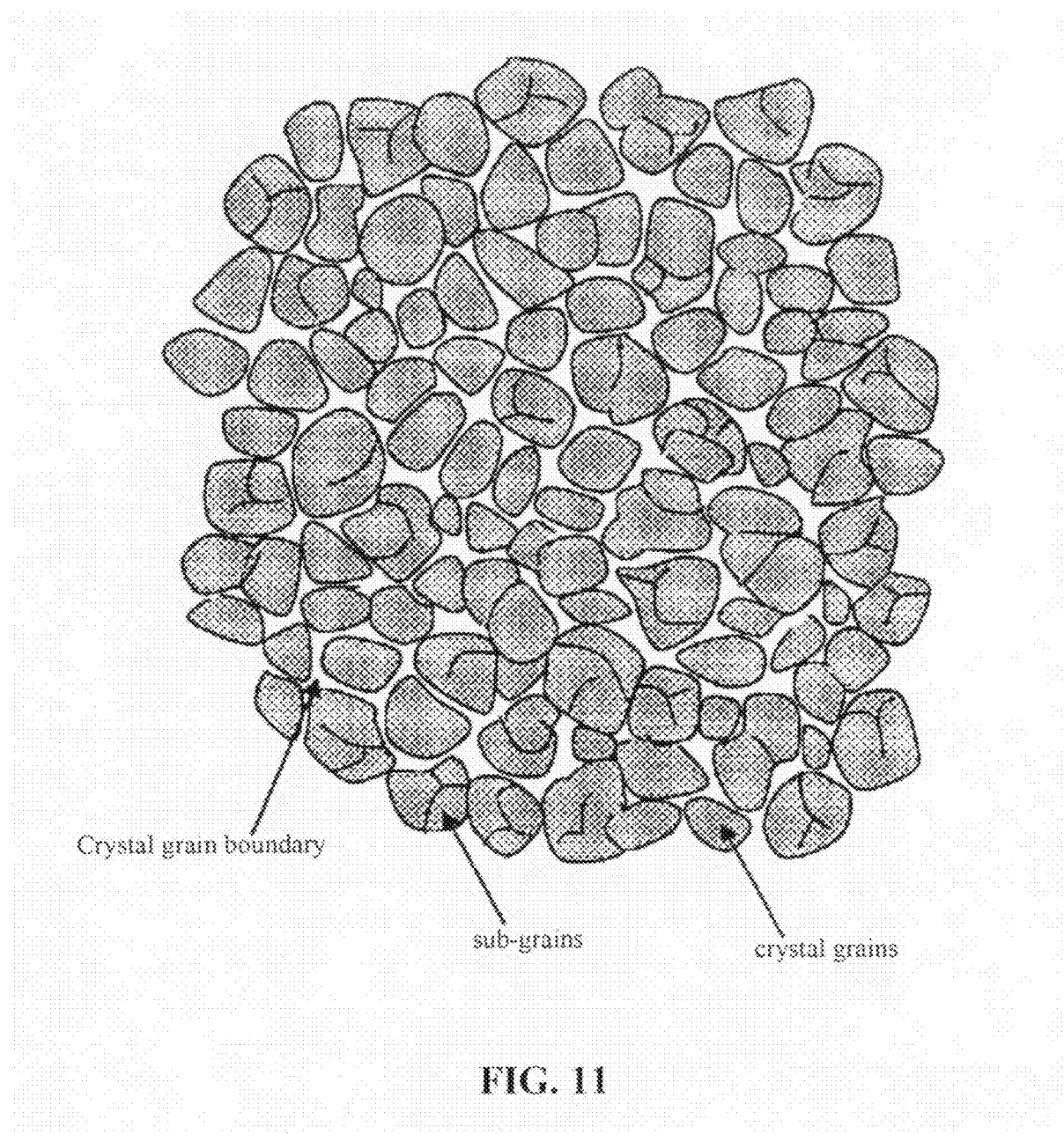
FIG. 11 is a schematic diagram showing the plan-view image, observed with a transmission electron microscope, of a Comparative Example of the first magnetic layer in which the crystal grain boundary contains only one oxide.

At the same time with Comparative Example 2-1 which only contains one oxide in the first magnetic layer, a comparison with the samples of the Exemplary embodiment shows that there is a reduction in both -Hn and SNR. The sample was prepared with a structure from which the second magnetic layer and the ferromagnetic metal layer was removed from the sample of Comparative Example 2-1, and upon observation of the microstructure of the First magnetic layer with a transmission electron microscope it was found that although segregation of Si oxide to the grain boundary was seen, the dispersion of the grain boundary width was large, and Si oxide remained within the magnetic grains and large numbers of sub-grains had formed, as shown in FIG. 11. The fact that a large amount of Si oxide remains in the ferromagnetic grains (core) with the formation of sub grains is liable to cause an increase in the switching field distribution and a deterioration in magnetic anisotropy, and cause a decrease in the nucleation field and SNR.

Moreover, with Comparative Example 2-3 in which the first magnetic layer does not contain an oxide, there is severe deterioration in both -Hn and the SNR. This indicates that magnetic cluster size has increased due to the very strong integranular exchange coupling between ferromagnetic grains without oxide constituting the grain boundary, resulting in a severe deterioration in the SNR. Moreover, as the exchange coupling is extremely strong, magnetization reversal occurs by domain wall motion, with the result that -Hn becomes extremely small.

In other words it is clear that the use of two or more oxides selected from among Si, Ti, B, Ta and Nb in magnetic layer 451 with the lowest Cr concentration promotes segregation of oxides to the grain boundary, effectively reducing the intergranular exchange coupling between the ferromagnetic grains.

In a comparison between Comparative Example 2-2 in which the second magnetic layer does not contain oxides and Exemplary embodiment 2-1, a deterioration can also be seen in -Hn and SNR. This would seem to be because as there are no oxides comprising the grain boundary, the exchange coupling between the ferromagnetic grains is strong compared to the granular structure, and the magnetic cluster size increases. In the case of Comparative Example 2-2, the Cr concentration in the second magnetic layer is high and the saturation magnetization is small and the second magnetic layer is laminated on the first magnetic layer having a granular structure, and in comparison to the case where a ferromagnetic metal layer not containing oxides is used in the first magnetic layer in Comparative Example 2-3, in Comparative Example 2-2 the increase in exchange coupling is small, and the deterioration in the SNR is reduced. Reduction in the -Hn is liable to be caused by the fact that as the Cr in the second magnetic layer hardly segregates to the grain boundary without help of oxygen and the anisotropy is severely reduced.

From the above results it is clear that it is preferable for the first magnetic layer to have a granular structure in which the oxides selected from among Si, Ti, B, Ta and Nb surround the ferromagnetic crystal grains, and that it is preferable to include an oxide in the second magnetic layer.

Exemplary Embodiment 3

Figure 12:
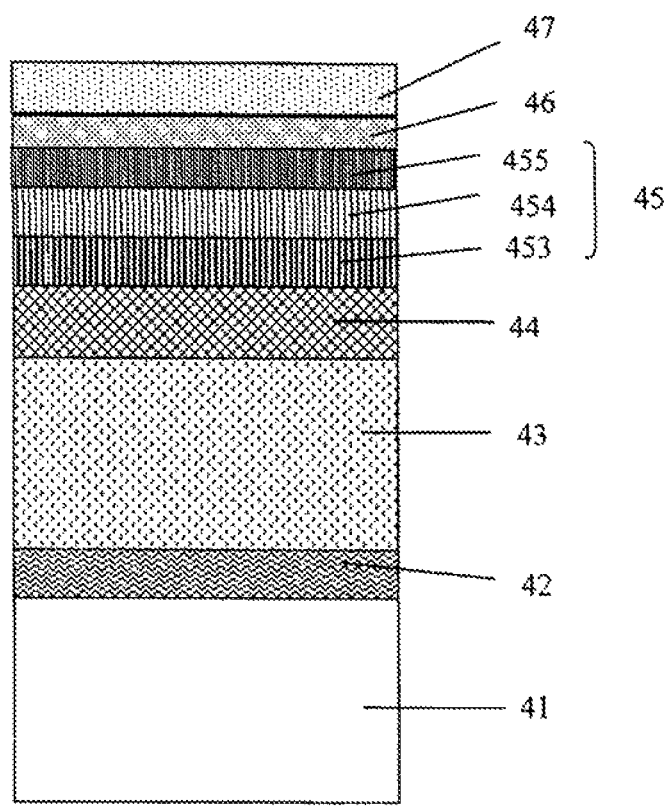
FIG. 12 is a schematic cross-sectional view illustrating an example of the PMRM, according to one embodiment.

The PMRM of this Exemplary embodiment with the layer structure shown in FIG. 12 was prepared using a sputtering device identical to that used in the above Exemplary embodiment 1. Apart from magnetic layer 45 the materials and process conditions were identical to that in Exemplary embodiment 1. A three-layer structure for magnetic layer 45 containing oxides comprised magnetic layer 453, magnetic layer 454, magnetic layer 455. When forming magnetic layer 453, magnetic layer 454 and magnetic layer 455 a composite target comprising CoCrPt alloy and the oxides shown in the table in FIG. 17 was used, forming the film thickness shown in the table in FIG. 17 at the rate of 3 nm/second.

When forming magnetic layer 453, the sputter gas conditions were varied in the sputter, and apart from the final 0.5 seconds the total gas pressure of an argon-oxygen mixed gas was 5 Pa, the concentration of oxygen had the values shown in the table in FIG. 17, and for the remaining 0.5 seconds the total gas pressure was 4 Pa and only argon gas was used. The substrate bias was –350 V.

Magnetic layer 454 was formed using argon-oxygen mixed gas or argon gas at the overall gas pressure of 5 Pa. The oxygen concentrations were as shown in the table in FIG. 17, and the substrate bias was –350 V.

As $Co_3O_4$ is unstable compared to $SiO_2$ and $TiO_2$, it decomposes during sputtering and acted as an oxygen supply source, supplementing the lack of uniformity in the oxygen supplied as sputter gas, contributing to the uniformity of magnetic characteristics.

When forming magnetic layer 455, the sputter gas conditions during sputtering were varied, and apart from the final 1 second the total gas pressure of the argon-oxygen mixed gas was 1.5 Pa, the oxygen concentration was as shown in the table in FIG. 17, and for the final 1 second the total gas pressure was 0.8 Pa of argon gas.

Where using a target which does not contain oxides as in Comparative Examples 3-5 to 3-7, only argon gas was used in the sputtering, to ensure that no oxides were formed.

The Cr concentration, film thickness and oxygen concentration, Hs and -Hn, OW and SNR for each layer is shown in the table in FIG. 17.

A comparison of Exemplary embodiments 3-1 to 3-3 with Comparative Examples 3-1 to 3-2 shows clearly that where magnetic layer 45 containing oxides is structured in 3 layers, a high OW and SNR can be obtained with the Cr concentration of magnetic layer 455 adjacent to ferromagnetic metal layer between 23 at. % and 32 at. %.

Where the Cr concentration of magnetic layer 455 adjacent to ferromagnetic metal layer drops below 23 at. %, the OW and SNR deteriorate. This indicates that where the Cr concentration of magnetic layer 455 is less than 23 at. %, the interlayer exchange coupling with the ferromagnetic metal layer becomes stronger, making it difficult for incoherent magnetization reversal of the ferromagnetic metal layer to take place, with OW characteristics deteriorating through an increase in the average anisotropy field and a deterioration in the SNR due to the fact that an adequate write-ability cannot be achieved.

Moreover, where the Cr concentration of magnetic layer 455 adjacent to the ferromagnetic metal layer exceeds 32 at. %, the magnetic anisotropy of magnetic layer 455 rapidly decreases and it becomes an essentially non-magnetic region, and the interlayer exchange coupling with the ferromagnetic metal layer rapidly decreases. The shape of the Kerr loop at this time takes the form of that shown for Case 1 in FIG. 4, indicating that magnetization reversal has separated. Where the magnetization reversal separates, not only do the overwrite characteristics deteriorate making it impossible to achieve adequate write-ability, but resolution rapidly deteriorates due to the separation of magnetization reversal in magnetic layers containing oxides and the ferromagnetic metal layer, resulting in the severe degradation of SNR. To achieve incoherent magnetization reversal for the ferromagnetic metal layer within the range where magnetic reversal of magnetic layer 455 and ferromagnetic metal layer does not separate, it is clear that it is preferable to have the Cr concentration of magnetic layer 455 between 23 at. % and 32 at. %.

Furthermore, a comparison of Exemplary embodiments 3-4, 3-11 and Comparative Examples 3-9 shows that a great difference is seen between the overwrite and SNR even where the Cr concentration of magnetic layer 455 is the same at 32 at. %. With Exemplary embodiment 3-4, the shape of the Kerr loop takes the form of that shown that for Case 2 in FIG. 4, indicating that the magnetization reversal of the magnetic layers occurs unitedly, but with Comparative Example 3-9 the Kerr loop takes the form shown for Case 1 in FIG. 4, indicating that the magnetization reversal of the layers has separated. In Exemplary embodiment 3-4, it may be considered that the magnetization reversal of the ferromagnetic metal layer promotes magnetization reversal of magnetic layer 455 immediately below it via exchange coupling between the layers, going on to promote magnetization reversal of magnetic layer 454 below that via exchange coupling with magnetic layer 454 and magnetic layer 455, with magnetization reversal of magnetic layer 453 below that finally occurring through exchange coupling between magnetic layer 453 and magnetic layer 454. In other words, it is possible to vary the exchange coupling between the layers by placing a layer having an intermediate Cr concentration in between, and therefore it is thought to be possible to suppress separation of the magnetization reversal even if the difference in Cr concentration between magnetic layer 453 and magnetic layer 455 is greater than 25 at. %.

On the other hand, as the difference in the Cr concentration between magnetic layer 454 and magnetic layer 455 in Comparative Example 3-9 is greater than 25 at. %, the magnetic anisotropic energy of magnetic layer 454 is greater than the exchange coupled energy between layers acting on magnetic layer 454 and magnetic layer 455, so that even if the magnetization reversal occurs for ferromagnetic metal layer and magnetic layer 455 there is no magnetization reversal in magnetic layer 453 due to the interlayer exchange coupling between magnetic layer 454 and magnetic layer 455, indicating that the magnetization reversal has separated. As a result, the overwrite deteriorates and an adequate write-ability cannot be achieved, and resolution rapidly deteriorates due to the fact that magnetization reversal has separated, and the SNR severely deteriorates.

To prevent magnetization reversal of magnetic layer 454 and magnetic layer 455 from separating, it is clear that the difference in the Cr concentration of magnetic layer 454 and magnetic layer 455 should be kept at 25 at. % or less.

It is also clear from a comparison of Exemplary embodiment 3-10 and Comparative Example 3-3 that there is a large difference in the overwrite and SNR even where the Cr concentration of magnetic layer 454 is kept the same at 32 at. %. With Exemplary embodiment 3-10, the Kerr loop indicates that magnetization reversal has occurred unitedly as in Case 2 in FIG. 4, whereas with Comparative Example 3-3 the Kerr loop indicates that magnetization reversal in Case 1 has separated. With Comparative Example 3-3 the magnetic anisotropic energy of magnetic layer 453 is too large in comparison to the exchange coupled energy acting between magnetic layer 453 and magnetic layer 454, indicating that magnetization reversal of magnetic layer 453 has not taken place due to the interlayer exchange coupling between magnetic layer 453 and magnetic layer 454 even where magnetization has reversed in ferromagnetic metal layer 46, magnetic layer 455 and magnetic layer 454, and that a separation has occurred in magnetization reversal. As a result, overwrite deteriorates and an adequate write-ability cannot be achieved, with resolution rapidly deteriorating due to the separation of magnetization reversal, and the SNR severely deteriorates. To prevent the magnetization reversal of magnetic layer 453 and magnetic layer 454 from separating, it is clear that the difference in Cr concentration between magnetic layer 453 and magnetic layer 454 should be kept at 25 at. % or less.

Where the Cr concentration of magnetic layer 454 is at 35 at. % as in Comparative Example 3-4, greater than 32 at. %, the magnetic anisotropy of magnetic layer 454 rapidly decreases becoming effectively a non-magnetic region, and the exchange coupling between magnetic layer 453 and magnetic layer 455 rapidly decreases causing separation to occur in the magnetization reversal between magnetic layer 453 and magnetic layer 455. As a result the SNR and overwrite deteriorates.

In other words where magnetic layers containing oxides are structured as a laminate of 3 or more layers, it is clear that with the difference in Cr concentration between adjacent magnetic layers containing oxides at less than 25 at. % and the Cr concentration of the magnetic layer containing oxides adjacent to the ferromagnetic metal layer at less than 32 at. %, magnetization reversal does not separate, and moreover it is possible to achieve an appropriate exchange coupling between the layers which can promote incoherent magnetization reversal, enabling a high OW and SNR to be achieved.

A comparison of Exemplary embodiment 3-5 to 3-9 with Comparative Example 3-5 to 3-7 shows that a high SNR can be obtained by ensuring that magnetic layers 453-455 are magnetic layers containing oxides in comparison to using magnetic layers which do not contain oxides, and the nucleation field also increases. In other words, it is clear that it is preferable to include oxides in magnetic layers 453-455.

A comparison of Comparative Example 3-8 and Exemplary embodiments 3-5 to 3-9 shows that a high SNR and nucleation field can be obtained by including two or more oxides selected from Si, Ti, B, Ta, Nb in magnetic layer 453 with the lowest Cr concentration. In Comparative Example 3-8 in which only one type of oxide was included in magnetic layer 453 with the lowest Cr concentration, the nucleation field and SNR were seen to be reduced in comparison to samples of the Exemplary embodiment.

A sample was prepared with a structure in which ferromagnetic metal layer 46, magnetic layer 455 and magnetic layer 454 were removed from a sample of the Exemplary embodiment, and upon observation of the microstructure of magnetic layer 453 with a transmission electron microscope, it was confirmed that a uniform grain boundary in which oxides surround the ferromagnetic crystal grains had formed, with a structure similar to that in FIG. 10 with few sub-grains. At the same time, a sample was prepared with a structure in which ferromagnetic metal layer 46, magnetic layer 455, magnetic layer 454 were removed from the sample in Comparative Example 3-8 and upon observation of the microstructure of the first magnetic layer with a transmission electron microscope, it was found that the dispersion of the grain boundary width was large despite the fact that Si oxides were observed to segregate to the grain boundary, with Si oxides remaining within the magnetic grains and large numbers of sub-grains forming with the structure shown in FIG. 11. A reduction in magnetic anisotropy and an increase in the switching field distribution due to the Si oxides remaining in large quantities in the ferromagnetic grains (core) and the formation of sub-grains. Moreover, as saturation magnetization increases when the Cr concentration is low, a strong intergranular exchange coupling between ferromagnetic grains in regions where there is a narrow grain boundary width and it is liable to cause an increase in the cluster size. As a result, it is liable that nucleation field and SNR deteriorated.

From the above results it is clear that by using at least two oxides selected from Si, Ti, B, Ta, Nb in magnetic layer 453 with the lowest Cr concentration, segregation of the oxides to the grain boundary is promoted, and exchange coupling between the ferromagnetic grains is effectively reduced, enabling a high SNR and thermal stability.

Next a comparison of Exemplary embodiments 3-5 to 3-9 with Comparative Example 3-5 shows that although it is preferable to include an oxide in magnetic layer 454, the difference due to the oxide is virtually invisible. This indicates that as a granular structure has formed in the stage of growth of magnetic layer 453 formed below magnetic layer 454, it is easier for magnetic grains and the oxides to separate, and the influence of the oxides is less.

From Exemplary embodiment 3-12 it is clear that having the layer with the lowest Cr concentration among the magnetic layers containing oxides closest to the substrate is not always most preferable.

With the samples in Exemplary embodiments 3-1 to 3-13, the nucleation field (-Hn) for all of them is 159.2 kA/m (approx 2 kOe) or above, enabling suppression of deterioration in the signal at temperatures above 60° C. (thermal demagnetization) when incorporated in a magnetic recording device, confirming that there are no problems in practical use. In order to achieve a high thermal stability, it is effective to use materials having a low Cr concentration and a high magnetic anisotropy, with the Cr concentration in magnetic layers in which Cr concentration is lowest and magnetic anisotropy is largest held at 17 at. % or less.

Where the Cr concentration in magnetic layers in which the Cr concentration is lowest is 3 at. % as in Comparative Example 3-10, with the Cr concentration less than 5 at. %, the SNR severely deteriorates. This indicates that in regions where grain boundary formation is insufficient, the magnetic cluster size rapidly increases due to the strong exchange coupling because the saturation magnetization of magnetic grains (core) of the magnetic layer with the lowest Cr concentration is extremely high. In other words, where Cr concentration in the first magnetic layer is less than 5 at. %, the nonuniformity of the microscopic structure is liable to have an influence, and it is preferable that the Cr concentration in the magnetic layer with the lowest Cr concentration be 5 at. % or higher.

From the above results it is clear that with magnetic layers containing oxides having a 3 layer structure, and the Cr concentration in the magnetic layers 455 adjacent to the ferromagnetic metal layer being between 23 at. % and 32 at. %, the Cr concentration in magnetic layer 454 being less than 32 at. %, the difference in the Cr concentration between adjacent magnetic layers is less than 25 at. %, the magnetic layer containing oxides with the lowest Cr concentration having a granular structure in which the oxides surround the ferromagnetic grains, and the nucleation field (-Hn) being 159.2 kA/m (approx 2 kOe) or more, a high write-ability (overwrite characteristics), high SNR and high thermal stability can be achieved.

It is also clear that with the Cr concentration in the magnetic layer with the lowest Cr concentration between 5 at. % and 17 at. %, by using two or more oxides selected from Si, Ti, B, Ta, Nb in the magnetic layer with the lowest Cr concentration, the generation of sub-grains can be suppressed and the exchange coupling between ferromagnetic grains effectively reduced, allowing a high SNR and high thermal stability to be obtained.

Even where the magnetic layers containing oxides are structured to have four or more layers, with the Cr concentration of the magnetic layer adjacent to the ferromagnetic metal layer between 23 at. % and 32 at. % and the Cr concentration at 32 at. % or less in the magnetic layer between layers with the lowest Cr concentration and the magnetic layer adjacent to the ferromagnetic metal layer, by keeping the difference in the Cr concentration between adjacent magnetic layers below 25 at. % it is possible to have exchange coupling between the layers appropriate to promote incoherent magnetization reversal whilst suppressing separation in the magnetization reversal of the magnetic layers, enabling a high write-ability to be achieved. A high SNR can also be achieved by having a granular structure for the magnetic layer with the lowest Cr concentration in which the oxides surround the ferromagnetic grains.

The use of at least two kinds of oxides from Si, Ti, B, Ta, Nb as the oxide forming the granular structure of the magnetic layer with the lowest Cr concentration is preferable as it is possible to suppress generation of sub-grains and form a uniform grain boundary. As it is liable that the nonuniformity of the microstructure will exert a great influence where the Cr concentration in the magnetic layer with the lowest Cr concentration is less than 5 at. %, it will preferably be 5 at. % or more. It is also possible to achieve a high thermal stability by having the nucleation field (-Hn) at 159.2 kA/m (approx 2 kOe) or higher. The Cr concentration for the magnetic layer with the lowest Cr concentration should be at least 17 at. % or less.

The use of a structure which satisfies these conditions enables a high write-ability (overwrite characteristics), a high SNR, and a high thermal stability to be achieved. For example, apart from the magnetic layers having a 4-layer structure, it is clear that it is possible to obtain the above performance with the structure of Exemplary embodiments 3-14, 3-15 shown in the table in FIG. 18 with a layer structure and conditions the same as for Exemplary embodiments 3-1 to 3-13. Ordered in closeness to the substrate, the magnetic layers were magnetic layer 456, magnetic layer 457, magnetic layer 458, and magnetic layer 459.

Exemplary Embodiment 4

Figure 13:
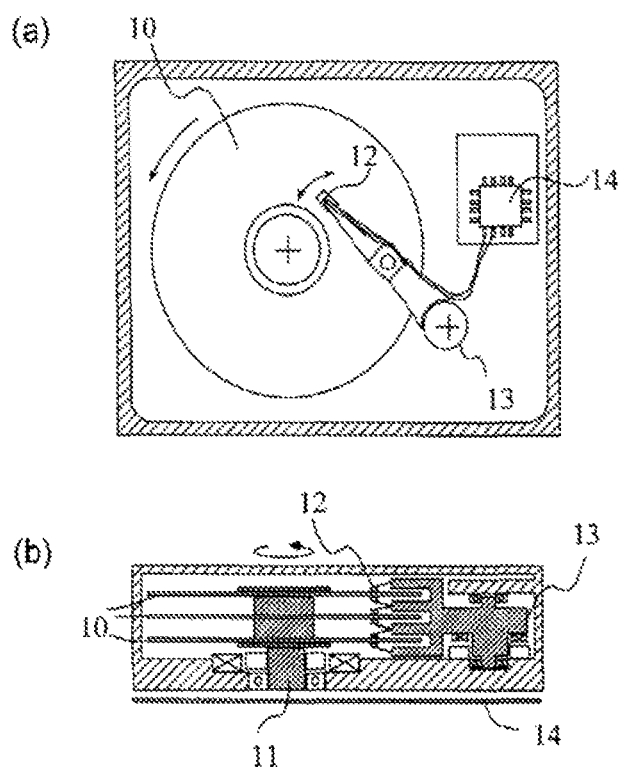
FIG. 13 is a schematic cross-sectional view of a magnetic recording device, according to one embodiment.
Figure 14:
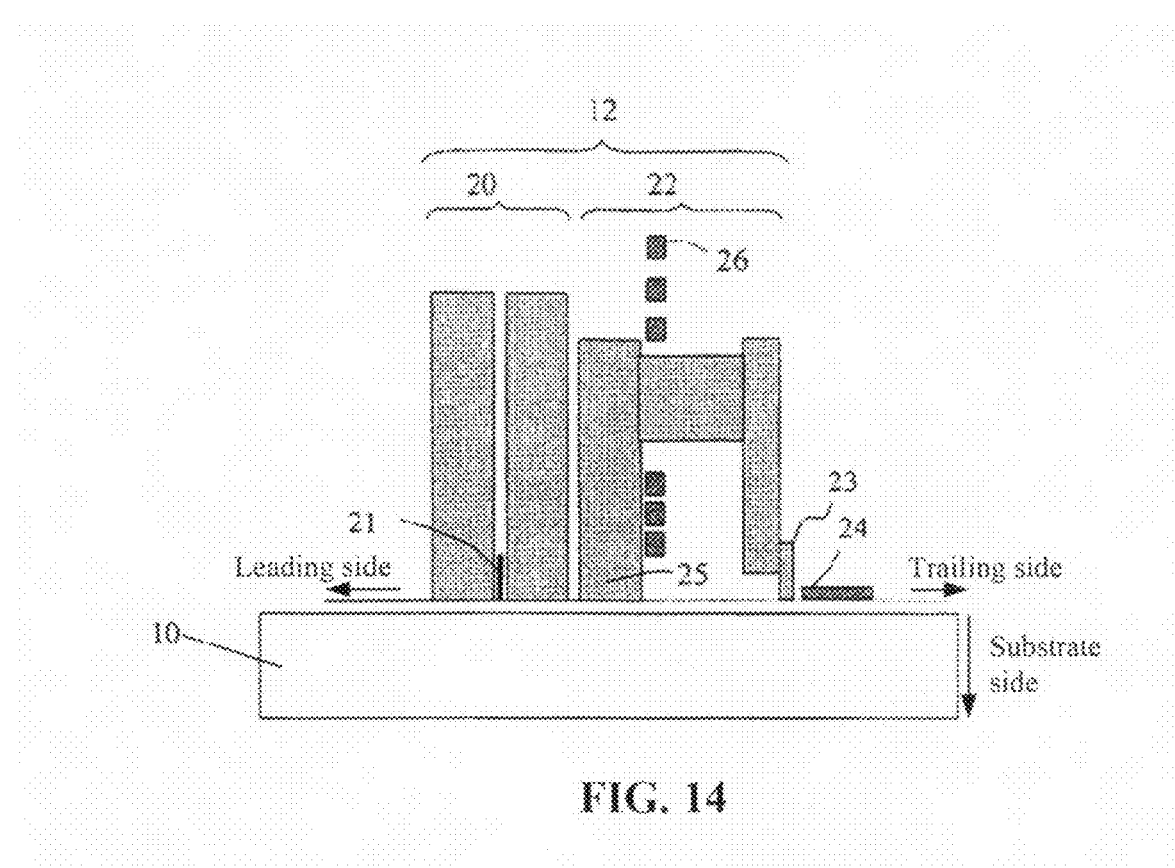
FIG. 14 is a schematic diagram illustrating the relationship between the magnetic head and the magnetic recording medium, according to one embodiment.

FIG. 13 shows a schematic cross-section of a magnetic recording device in an Exemplary embodiment of the invention. Magnetic recording medium 10 is formed from the medium of Exemplary embodiments 1-3, and has drive unit 11 which drives this magnetic recording medium, magnetic head 12 comprising a reader and a writer, means 13 which enables magnetic head to move relative to the magnetic recording medium, and means 14 which enables input of signals to and output from the magnetic head. FIG. 14 shows the relationship between magnetic head 12 and magnetic recording medium 10. The magnetic spacing is 2 nm, and a tunneling magnetoresistive (TMR) effect element is used in element 21 of reader 20, the shield length is 30 nm, and the track width is 40 nm. Writer 22 is provided with main pole 23, auxiliary pole 25 and thin-film conductor coil 26, with wrap-around shield 24 formed around main pole 23, a geometric track width for the pole tip of the main pole of 60 nm, a distance between the main pole and the trailing shield of 30 nm, a distance between the main pole and side shield of 100 nm. By using the medium described herein according to various embodiments, it was possible to confirm an operation of 77.7 gigabits per square centimeter (approx 500 Gb/in$^2$) at a track density per 1 cm of 118100 tracks (300 kTPI), a linear recording density per 1 cm of 657480 bits (1670 kBPI).

It is also possible to use a shielded head with no side shield in the cross-track direction as the writer. It is also possible to use a giant magnetoresistance effect element (GMR) and a giant magnetoresistance effect element which causes current to flow perpendicular to the plane of the element (CPP-GMR) as the reader.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium (PMRM), comprising:
a substrate;
a soft magnetic underlayer formed above the substrate;
an underlayer formed above the soft magnetic underlayer;
a magnetic layer formed above the underlayer, the magnetic layer comprising Co, Cr, Pt, and oxides thereof;
a ferromagnetic metal layer formed above the magnetic layer, the ferromagnetic metal layer comprising Co, Cr, and Pt, wherein the ferromagnetic metal layer does not include oxides,
wherein the underlayer controls orientation and segregation of the magnetic layer,
wherein the magnetic layer having oxides comprises a first magnetic layer and a second magnetic layer nearer to the ferromagnetic metal layer than the first magnetic layer,
wherein the first magnetic layer has a granular structure in which oxides surround ferromagnetic grains therein,
wherein a Cr concentration of the second magnetic layer is between 26 at. % and about 32 at. %,
wherein the Cr concentration of the second magnetic layer is greater than a Cr concentration of the first magnetic layer,
wherein a difference between the Cr concentration of the first magnetic layer and a Cr concentration of the second magnetic layer is less than about 25 at. %, and
wherein a nucleation field is larger than about 159.2 kA/m.

2. The perpendicular magnetic recording medium of claim 1, wherein the Cr concentration of the first magnetic layer is between about 5 at. % and about 17 at. %.

3. The perpendicular magnetic recording medium of claim 1, wherein the second magnetic layer comprises a gradient which ensures that a high concentration of Cr oxide is on a substrate side of the second magnetic layer and a low concentration of Cr oxide on a ferromagnetic metal layer side of the second magnetic layer.

4. The perpendicular magnetic recording medium of claim 1, wherein crystal grains of the first magnetic layer include at least two kinds of oxides from Si, Ti, Ta, Nb, and B.

5. The perpendicular magnetic recording medium of claim 1, wherein the Cr concentration of the second magnetic layer is between 27 at. % and about 32 at. %.

6. The perpendicular magnetic recording medium of claim 1, wherein the Cr concentration of the first magnetic layer is between about 5 at. % and about 8 at. %.

7. The perpendicular magnetic recording medium of claim 6, wherein crystal grains of the first magnetic layer include at least two kinds of oxides from Si, Ti, Ta, Nb, and B.

8. The perpendicular magnetic recording, medium of claim 1, wherein the Cr concentration of the second magnetic layer is between about 30 at. % and about 32 at. %.

9. A system, comprising:
a perpendicular magnetic recording medium as described in claim 1;
at least one magnetic head for reading from and/or writing to the magnetic recording medium;
a magnetic head slider for supporting the magnetic head; and
a control unit coupled to the magnetic head for controlling operation of the magnetic head.

10. A perpendicular magnetic recording medium (PMRM), comprising:
a substrate;
a soft magnetic underlayer formed above the substrate;
an underlayer formed above the soft magnetic underlayer;
a magnetic layer formed above the underlayer, the magnetic layer comprising Co, Cr, Pt, and oxides thereof; and
a ferromagnetic metal layer formed above the magnetic layer, the ferromagnetic metal layer comprising Co, Cr, and Pt, wherein the ferromagnetic metal layer does not include oxides,
wherein the underlayer controls orientation and segregation of the magnetic layer,
wherein the magnetic layer comprises at least three magnetic layers,
wherein a Cr concentration of a magnetic layer adjacent to the ferromagnetic metal layer is between 26 at. % and about 32 at. %,
wherein a Cr concentration of magnetic layers between the magnetic layer adjacent to the ferromagnetic metal layer and a magnetic layer having a lowest Cr concentration among the at least three magnetic layers is less than about 32 at. %,
wherein a difference between a Cr concentration of adjacent magnetic layers between the magnetic layer adjacent to the ferromagnetic metal layer and the magnetic layer having a lowest Cr concentration among the at least three magnetic layers is less than about 25 at %,
wherein the magnetic layer having a lowest Cr concentration among the at least three magnetic layers has a granular structure in which oxides surround ferromagnetic grains therein, and
wherein a nucleation field is larger than about 1592 kA/m.

11. The perpendicular magnetic recording medium of claim 10, wherein a Cr concentration of the magnetic layer having a lowest Cr concentration is between about 5 at. % and about 8 at. %.

12. The perpendicular magnetic recording medium of claim 11, wherein the magnetic layer adjacent to the ferromagnetic metal layer comprises a gradient which ensures that a high concentration of Cr oxide is on a substrate side of the magnetic layer adjacent to the ferromagnetic metal layer and a low concentration of Cr oxide on a ferromagnetic metal layer side of the magnetic layer adjacent to the ferromagnetic metal layer.

13. The perpendicular magnetic recording medium of claim 10, wherein crystal grains of the magnetic layer having a lowest Cr concentration include at least two kinds of oxides from Si, Ti, Ta, Nb, and B.

14. The perpendicular magnetic recording medium of claim 10, wherein the Cr concentration of the magnetic layer adjacent to the ferromagnetic metal layer is between 27 at. % and about 32 at. %.

15. The perpendicular magnetic recording medium of claim 14, wherein the Cr concentration of the magnetic layer adjacent to the ferromagnetic metal layer is between about 30 at. % and about 32 at. %.

16. The perpendicular magnetic recording medium of claim 10, wherein a Cr concentration of the magnetic layer having a lowest Cr concentration is between about 5 at. % and about 8 at. %.

17. The perpendicular magnetic recording medium of claim 16, wherein crystal grains of the magnetic layer having a lowest Cr concentration include at least two kinds of oxides from Si, Ti, Ta, Nb, and B.

18. A system, comprising:
a perpendicular magnetic recording medium as described in claim 10;
at least one magnetic head for reading from and/or writing to the magnetic recording medium;
a magnetic head slider for supporting the magnetic head; and
a control unit coupled to the magnetic head for controlling operation of the magnetic head.

* * * * *

UNITED STATES PATENT AND TRADEMARK OFFICE
CERTIFICATE OF CORRECTION

PATENT NO. : 8,705,208 B2
APPLICATION NO. : 12/828073
DATED : April 22, 2014
INVENTOR(S) : Nakagawa et al.

It is certified that error appears in the above-identified patent and that said Letters Patent is hereby corrected as shown below:

In the specification:

col. 7, line 18 replace "(Her)" with --(Hcr)--;

col. 14, line 36 replace "Concentration" with --concentration--;

col. 16, line 63 replace "First" with --first--.

In the claims:

col. 24, line 35 replace "1592" with --159.2--.

Signed and Sealed this
Twenty-second Day of July, 2014

Michelle K. Lee
*Deputy Director of the United States Patent and Trademark Office*